US012015681B2

(12) United States Patent
Kalus et al.

(10) Patent No.: US 12,015,681 B2
(45) Date of Patent: *Jun. 18, 2024

(54) METHODS AND APPARATUS TO DETERMINE MEDIA IMPRESSIONS USING DISTRIBUTED DEMOGRAPHIC INFORMATION

(71) Applicant: The Nielsen Company (US), LLC, New York, NY (US)

(72) Inventors: Mark Kalus, New York, NY (US); Ari Paparo, New York, NY (US); Kevin Geraghty, Dublin, CA (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/313,057

(22) Filed: May 5, 2023

(65) Prior Publication Data

US 2023/0396689 A1    Dec. 7, 2023

Related U.S. Application Data

(60) Continuation of application No. 18/068,262, filed on Dec. 19, 2022, now Pat. No. 11,729,287, which is a
(Continued)

(51) Int. Cl.
*H04L 67/50*    (2022.01)
*G06F 16/955*    (2019.01)
(Continued)

(52) U.S. Cl.
CPC .......... *H04L 67/535* (2022.05); *G06F 16/955* (2019.01); *G06Q 30/02* (2013.01);
(Continued)

(58) Field of Classification Search
CPC .................. H04L 67/02; H04L 67/146; H04L 67/30–306; H04L 67/535;
(Continued)

(56) References Cited

U.S. PATENT DOCUMENTS 995,010 A    6/1911    Jeffery
3,540,003 A    11/1970    Murphy
(Continued)

FOREIGN PATENT DOCUMENTS

AU    774177 A    1/2001
AU    774177 B2    6/2004
(Continued)

OTHER PUBLICATIONS

Japanese Patent Office, Written Opinion,' issued in connection with Japanese Patent Application No. 2019-193447, dated Feb. 4, 2021, 6 pages. [English Translation Included.].
(Continued)

*Primary Examiner* — Brendan Y Higa

(57) ABSTRACT

Examples to determine media impressions using distributed demographic information are disclosed. An example system includes programmable circuitry to log, at a first Internet domain, a first record for a first website visit by a first client device to a website at a second Internet domain, the first record based on a hypertext transfer protocol (HTTP) request, the first record to include a timestamp, a uniform resource locator (URL), and a user identifier, the timestamp to represent a time of the first website visit, the URL corresponding to the website at the second Internet domain, and weight impression data in a report, the impression data associated with the first record and with second records, the second records corresponding to second website visits to the website via second client devices, the weighting of the
(Continued)

impression data based on demographic distributions of audience members corresponding to the first and second records.

20 Claims, 13 Drawing Sheets

Related U.S. Application Data continuation of application No. 17/199,139, filed on Mar. 11, 2021, now Pat. No. 11,533,379, which is a continuation of application No. 16/792,766, filed on Feb. 17, 2020, now Pat. No. 10,951,721, which is a continuation of application No. 16/364,961, filed on Mar. 26, 2019, now Pat. No. 10,567,531, which is a continuation of application No. 15/966,195, filed on Apr. 30, 2018, now Pat. No. 10,284,667, which is a continuation of application No. 15/409,281, filed on Jan. 18, 2017, now Pat. No. 9,979,614, which is a division of application No. 13/921,962, filed on Jun. 19, 2013, now Pat. No. 9,596,150, which is a continuation of application No. PCT/US2011/065881, filed on Dec. 19, 2011.

(60) Provisional application No. 61/424,952, filed on Dec. 20, 2010.

(51) Int. Cl.
| | |
|---|---|
| *G06Q 30/02* | (2023.01) |
| *G06Q 30/0201* | (2023.01) |
| *G06Q 30/0251* | (2023.01) |
| *H04L 43/04* | (2022.01) |
| *H04L 67/01* | (2022.01) |
| *H04L 67/02* | (2022.01) |
| *H04L 67/146* | (2022.01) |
| *H04L 67/306* | (2022.01) |

(52) U.S. Cl.
CPC ..... *G06Q 30/0201* (2013.01); *G06Q 30/0251* (2013.01); *G06Q 30/0255* (2013.01); *H04L 43/04* (2013.01); *H04L 67/01* (2022.05); *H04L 67/02* (2013.01); *H04L 67/146* (2013.01); *H04L 67/306* (2013.01)

(58) Field of Classification Search
CPC ...... G06Q 30/02–0206; G06Q 30/0251–0256; G06Q 30/0263; G06Q 30/0269; G06Q 30/0241–0277
See application file for complete search history.

(56) References Cited

U.S. PATENT DOCUMENTS

| | | | |
|---|---|---|---|
| 3,818,458 A | 6/1974 | Deese |
| 3,906,450 A | 9/1975 | Prado, Jr. |
| 3,906,454 A | 9/1975 | Martin |
| T955,010 I4 | 2/1977 | Ragonese et al. |
| 4,139,079 A | 2/1979 | Clark |
| 4,168,396 A | 9/1979 | Best |
| 4,230,990 A | 10/1980 | Lert, Jr. |
| 4,232,193 A | 11/1980 | Gerard |
| 4,306,289 A | 12/1981 | Lumley |
| 4,319,079 A | 3/1982 | Best |
| 4,361,832 A | 11/1982 | Cole |
| 4,367,525 A | 1/1983 | Brown et al. |
| 4,558,413 A | 12/1985 | Schmidt et al. |
| 4,558,991 A | 12/1985 | Barr |
| 4,588,413 A | 5/1986 | Keil |
| 4,588,991 A | 5/1986 | Atalla |
| 4,590,550 A | 5/1986 | Eilert et al. |
| 4,595,940 A | 6/1986 | Gandini |
| 4,595,950 A | 6/1986 | Loefberg |
| 4,658,093 A | 4/1987 | Hellman |
| 4,672,572 A | 6/1987 | Alsberg |
| 4,685,056 A | 8/1987 | Barnsdale, Jr. |
| 4,696,034 A | 9/1987 | Wiedemer |
| 4,703,324 A | 10/1987 | White |
| 4,718,005 A | 1/1988 | Feigenbaum et al. |
| 4,720,782 A | 1/1988 | Kovalcin |
| 4,734,865 A | 3/1988 | Scullion et al. |
| 4,740,890 A | 4/1988 | William |
| 4,747,139 A | 5/1988 | Taaffe |
| 4,757,533 A | 7/1988 | Allen et al. |
| 4,791,565 A | 12/1988 | Dunham et al. |
| 4,821,178 A | 4/1989 | Levin et al. |
| 4,825,354 A | 4/1989 | Agrawal et al. |
| 4,827,508 A | 5/1989 | Shear |
| 4,866,769 A | 9/1989 | Karp |
| 4,914,689 A | 4/1990 | Quade et al. |
| 4,926,162 A | 5/1990 | Pickell |
| 4,940,976 A | 7/1990 | Gastouniotis et al. |
| 4,943,963 A | 7/1990 | Waechter |
| 4,956,769 A | 9/1990 | Smith |
| 4,959,590 A | 9/1990 | Hatada et al. |
| 4,977,594 A | 12/1990 | Shear |
| 5,023,907 A | 6/1991 | Johnson et al. |
| 5,032,979 A | 7/1991 | Hecht et al. |
| 5,086,386 A | 2/1992 | Islam |
| 5,182,770 A | 1/1993 | Medveczky et al. |
| 5,204,897 A | 4/1993 | Wyman |
| 5,233,642 A | 8/1993 | Renton |
| 5,283,734 A | 2/1994 | Von Kohorn |
| 5,287,408 A | 2/1994 | Samson |
| 5,296,536 A | 3/1994 | Bartholomew |
| 5,343,239 A | 8/1994 | Lappington et al. |
| 5,355,484 A | 10/1994 | Record et al. |
| 5,374,951 A | 12/1994 | Welsh |
| 5,377,269 A | 12/1994 | Heptig et al. |
| 5,388,211 A | 2/1995 | Hornbuckle |
| 5,406,269 A | 4/1995 | Baran |
| 5,410,598 A | 4/1995 | Shear |
| 5,440,738 A | 8/1995 | Bowman et al. |
| 5,444,642 A | 8/1995 | Montgomery et al. |
| 5,450,134 A | 9/1995 | Legate |
| 5,483,658 A | 1/1996 | Grube et al. |
| 5,497,479 A | 3/1996 | Hornbuckle |
| 5,499,340 A | 3/1996 | Barritz |
| 5,559,808 A | 9/1996 | Kostreski et al. |
| 5,584,050 A | 12/1996 | Lyons |
| 5,594,934 A | 1/1997 | Lu et al. |
| 5,675,510 A | 10/1997 | Coffey et al. |
| 5,695,009 A | 12/1997 | Hipp |
| 5,734,720 A | 3/1998 | Salganicoff |
| 5,793,409 A | 8/1998 | Tetsumura |
| 5,793,410 A | 8/1998 | Rao |
| 5,796,352 A | 8/1998 | Tanaka et al. |
| 5,796,952 A | 8/1998 | Davis |
| 5,812,928 A | 9/1998 | Watson, Jr. |
| 5,822,533 A | 10/1998 | Saito |
| 5,832,520 A | 11/1998 | Miller |
| 5,848,396 A | 12/1998 | Gerace |
| 5,855,008 A | 12/1998 | Goldhaber et al. |
| 5,870,740 A | 2/1999 | Rose et al. |
| 5,940,738 A | 8/1999 | Rao |
| 5,948,061 A | 9/1999 | Merriman et al. |
| 6,035,339 A | 3/2000 | Agraharam et al. |
| 6,052,730 A | 4/2000 | Felciano et al. |
| 6,055,573 A | 4/2000 | Gardenswartz et al. |
| 6,073,241 A | 6/2000 | Rosenberg et al. |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,141,694 A | 10/2000 | Gardner |
| 6,144,988 A | 11/2000 | Kappel |
| 6,164,975 A | 12/2000 | Weingarden et al. |
| 6,223,215 B1 | 4/2001 | Hunt et al. |
| 6,247,050 B1 | 6/2001 | Tso et al. |
| 6,275,934 B1 | 8/2001 | Novicov et al. |
| 6,279,036 B1 | 8/2001 | Himmel et al. |

(56) References Cited

U.S. PATENT DOCUMENTS

| | | |
|---|---|---|
| 6,286,140 B1 | 9/2001 | Ivanyi |
| 6,339,423 B1 | 1/2002 | Sampson et al. |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,527,638 B1 | 3/2003 | Walker |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,704,787 B1 | 3/2004 | Umbreit |
| 6,714,917 B1 | 3/2004 | Eldering et al. |
| 6,732,331 B1 | 5/2004 | Alexander |
| 6,839,680 B1 | 1/2005 | Liu et al. |
| 6,877,007 B1 | 4/2005 | Hentzel et al. |
| 6,904,408 B1 | 6/2005 | McCarthy et al. |
| 6,959,420 B1 | 10/2005 | Mitchell et al. |
| 6,993,590 B1 | 1/2006 | Gauthier et al. |
| 7,039,699 B1 | 5/2006 | Narin et al. |
| 7,092,926 B2 | 8/2006 | Cerrato |
| 7,139,723 B2 | 11/2006 | Conkwright et al. |
| 7,143,195 B2 | 11/2006 | Vange et al. |
| 7,146,329 B2 | 12/2006 | Conkwright et al. |
| 7,150,030 B1 | 12/2006 | Eldering et al. |
| 7,152,074 B2 | 12/2006 | Dettinger et al. |
| 7,159,023 B2 | 1/2007 | Tufts |
| 7,181,412 B1 | 2/2007 | Fulgoni et al. |
| 7,234,408 B1 | 6/2007 | Clemmons et al. |
| 7,257,546 B2 | 8/2007 | Ebrahimi et al. |
| 7,260,837 B2 | 8/2007 | Abraham et al. |
| 7,272,617 B1 | 9/2007 | Bayer et al. |
| 7,302,447 B2 | 11/2007 | Dettinger et al. |
| 7,343,417 B2 | 3/2008 | Baum |
| 7,363,643 B2 | 4/2008 | Drake et al. |
| 7,386,473 B2 | 6/2008 | Blumenau |
| 7,406,516 B2 | 7/2008 | Davis et al. |
| 7,526,538 B2 | 4/2009 | Wilson |
| 7,546,370 B1 | 6/2009 | Acharya et al. |
| 7,590,568 B2 | 9/2009 | Blumenau |
| 7,599,920 B1 | 10/2009 | Fox et al. |
| 7,600,014 B2 | 10/2009 | Russell et al. |
| 7,613,365 B2 | 11/2009 | Wang |
| 7,613,635 B2 | 11/2009 | Blumenau |
| 7,634,786 B2 | 12/2009 | Knee et al. |
| 7,644,156 B2 | 1/2010 | Blumenau |
| 7,647,418 B2 | 1/2010 | Ash et al. |
| 7,650,407 B2 | 1/2010 | Blumenau |
| 7,653,724 B2 | 1/2010 | Blumenau |
| 7,653,942 B2 | 1/2010 | Tamura et al. |
| 7,693,863 B2 | 4/2010 | Martin et al. |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,788,216 B2 | 8/2010 | Li et al. |
| 7,836,009 B2 | 11/2010 | Paczkowski et al. |
| 7,882,054 B2 | 2/2011 | Levitan |
| 7,882,242 B2 | 2/2011 | Chen |
| 7,890,451 B2 | 2/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,949,639 B2 | 5/2011 | Hunt et al. |
| 7,958,234 B2 | 6/2011 | Thomas et al. |
| 7,962,603 B1 | 6/2011 | Morimoto |
| 8,006,259 B2 | 8/2011 | Drake et al. |
| 8,032,626 B1 | 10/2011 | Russell et al. |
| 8,046,255 B2 | 10/2011 | Bistriceanu et al. |
| 8,060,601 B1 | 11/2011 | Brown et al. |
| 8,087,041 B2 | 12/2011 | Fu et al. |
| 8,131,763 B2 | 3/2012 | Tuscano et al. |
| 8,131,861 B2 | 3/2012 | Butler et al. |
| 8,151,194 B1 | 4/2012 | Chan et al. |
| 8,180,112 B2 | 5/2012 | Kurtz et al. |
| 8,229,780 B2 | 7/2012 | Davidow et al. |
| 8,234,408 B2 | 7/2012 | Jungck |
| 8,235,814 B2 | 8/2012 | Willis et al. |
| 8,266,687 B2 | 9/2012 | Baldry |
| 8,271,886 B2 | 9/2012 | Lee et al. |
| 8,280,683 B2 | 10/2012 | Finkler |
| 8,290,800 B2 | 10/2012 | Law et al. |
| 8,302,120 B2 | 10/2012 | Ramaswamy |
| 8,307,006 B2 | 11/2012 | Hannan et al. |
| 8,359,238 B1 * | 1/2013 | Kauchak ............ G06Q 30/02 705/14.66 |
| 8,370,489 B2 | 2/2013 | Mazumdar et al. |
| 8,412,648 B2 | 4/2013 | Karypis et al. |
| 8,453,173 B1 | 5/2013 | Anderson et al. |
| 8,468,271 B1 | 6/2013 | Panwar et al. |
| 8,484,511 B2 | 7/2013 | Tidwell et al. |
| 8,495,198 B2 | 7/2013 | Sim et al. |
| 8,504,411 B1 | 8/2013 | Subasic et al. |
| 8,504,507 B1 | 8/2013 | Srinivasaiah |
| 8,543,454 B2 | 9/2013 | Fleischman et al. |
| 8,543,518 B2 | 9/2013 | Verma et al. |
| 8,549,552 B2 | 10/2013 | Ramaswamy et al. |
| 8,595,069 B2 | 11/2013 | Shkedi et al. |
| 8,600,796 B1 | 12/2013 | Sterne et al. |
| 8,626,084 B2 | 1/2014 | Chan et al. |
| 8,631,122 B2 | 1/2014 | Kadam et al. |
| 8,645,453 B2 | 2/2014 | Cheng et al. |
| 8,650,587 B2 | 2/2014 | Bhatia et al. |
| 8,688,524 B1 | 4/2014 | Ramalingam et al. |
| 8,700,457 B2 | 4/2014 | Craft |
| 8,713,168 B2 | 4/2014 | Heffernan et al. |
| 8,751,461 B2 | 6/2014 | Abraham et al. |
| 8,775,332 B1 | 7/2014 | Morris et al. |
| 8,831,362 B1 | 9/2014 | Steffens |
| 8,843,626 B2 | 9/2014 | Mazumdar et al. |
| 8,875,243 B1 | 10/2014 | Cherukumudi et al. |
| 8,898,309 B2 | 11/2014 | Goldspink et al. |
| 8,898,689 B2 | 11/2014 | Georgakis |
| 8,909,771 B2 | 12/2014 | Heath |
| 8,910,195 B1 | 12/2014 | Barney |
| 8,930,701 B2 | 1/2015 | Burbank et al. |
| 8,935,721 B2 * | 1/2015 | Tidwell ............ H04N 21/26225 725/35 |
| 8,943,309 B1 | 1/2015 | Schilder et al. |
| 8,954,536 B2 | 2/2015 | Kalus et al. |
| 8,973,023 B1 | 3/2015 | Rao et al. |
| 8,984,547 B2 | 3/2015 | Lambert et al. |
| 9,003,441 B1 | 4/2015 | Jindal et al. |
| 9,055,021 B2 | 6/2015 | Heffernan et al. |
| 9,055,122 B2 | 6/2015 | Grecco et al. |
| 9,117,217 B2 | 8/2015 | Wilson et al. |
| 9,135,655 B2 | 9/2015 | Buchalter et al. |
| 9,154,565 B2 | 10/2015 | Monighetti |
| 9,166,714 B2 | 10/2015 | Barve et al. |
| 9,215,288 B2 | 12/2015 | Seth et al. |
| 9,497,090 B2 | 11/2016 | Srivastava et al. |
| 9,596,150 B2 | 3/2017 | Kalus et al. |
| 9,596,151 B2 | 3/2017 | Heffernan et al. |
| 9,606,454 B2 | 3/2017 | Taguchi et al. |
| 9,979,614 B2 | 5/2018 | Kalus et al. |
| 10,027,773 B2 | 7/2018 | Seth et al. |
| 10,046,239 B2 | 8/2018 | Van Datta |
| 10,217,129 B2 | 2/2019 | Ferber et al. |
| 10,284,667 B2 | 5/2019 | Kalus et al. |
| 10,536,543 B2 | 1/2020 | Seth et al. |
| 10,567,531 B2 | 2/2020 | Kalus et al. |
| 10,951,721 B2 | 3/2021 | Kalus et al. |
| 11,218,555 B2 | 1/2022 | Heffernan et al. |
| 11,356,521 B2 | 6/2022 | Seth et al. |
| 11,533,379 B2 | 12/2022 | Kalus et al. |
| 2001/0034646 A1 | 10/2001 | Hoyt et al. |
| 2001/0054004 A1 | 12/2001 | Powers |
| 2002/0010776 A1 | 1/2002 | Lerner |
| 2002/0023159 A1 | 2/2002 | Vange et al. |
| 2002/0032602 A1 * | 3/2002 | Lanzillo, Jr. ............ G06Q 30/06 705/14.66 |
| 2002/0054089 A1 * | 5/2002 | Nicholas ............ G06Q 30/02 715/745 |
| 2002/0065896 A1 | 5/2002 | Burakoff et al. |
| 2002/0078144 A1 | 6/2002 | Lamkin et al. |

(56) References Cited

U.S. PATENT DOCUMENTS

| | | |
|---|---|---|
| 2002/0099605 A1* | 7/2002 | Weitzman .............. G06Q 30/02 705/14.35 |
| 2002/0099609 A1 | 7/2002 | Nascenzi et al. |
| 2003/0006911 A1 | 1/2003 | Smith et al. |
| 2003/0037131 A1 | 2/2003 | Verma |
| 2003/0046159 A1 | 3/2003 | Ebrahimi et al. |
| 2003/0046385 A1 | 3/2003 | Vincent |
| 2003/0065770 A1 | 4/2003 | Davis et al. |
| 2003/0074252 A1 | 4/2003 | Chandler-Pepelnjak et al. |
| 2003/0101454 A1 | 5/2003 | Ozer et al. |
| 2003/0105604 A1 | 6/2003 | Ash et al. |
| 2003/0163516 A1 | 8/2003 | Perkins et al. |
| 2003/0177488 A1 | 9/2003 | Smith et al. |
| 2003/0187976 A1 | 10/2003 | Decime |
| 2003/0220901 A1 | 11/2003 | Carr et al. |
| 2004/0088212 A1 | 5/2004 | Hill |
| 2004/0107125 A1 | 6/2004 | Guheen et al. |
| 2004/0167928 A1 | 8/2004 | Anderson et al. |
| 2004/0186840 A1 | 9/2004 | Dettinger et al. |
| 2004/0193892 A1 | 9/2004 | Tamura |
| 2005/0033657 A1 | 2/2005 | Herrington et al. |
| 2005/0154640 A1* | 7/2005 | Kolluri .................. G06Q 30/02 705/14.53 |
| 2005/0166233 A1 | 7/2005 | Beyda et al. |
| 2005/0204148 A1 | 9/2005 | Mayo et al. |
| 2005/0223093 A1 | 10/2005 | Hanson et al. |
| 2005/0257141 A1 | 11/2005 | Brandrud |
| 2005/0273388 A1 | 12/2005 | Roetter |
| 2005/0278708 A1 | 12/2005 | Zhao et al. |
| 2006/0026067 A1* | 2/2006 | Nicholas ............ G06Q 30/0261 705/14.58 |
| 2006/0056413 A1 | 3/2006 | Ikeda et al. |
| 2006/0070117 A1 | 3/2006 | Spalink et al. |
| 2006/0074953 A1 | 4/2006 | Dettinger et al. |
| 2006/0089754 A1 | 4/2006 | Mortenson |
| 2006/0178996 A1 | 8/2006 | Matsushima et al. |
| 2006/0265495 A1 | 11/2006 | Butler |
| 2006/0271641 A1 | 11/2006 | Stavrakos et al. |
| 2006/0282328 A1 | 12/2006 | Gerace et al. |
| 2006/0294259 A1 | 12/2006 | Matefi et al. |
| 2007/0005606 A1 | 1/2007 | Ganesan et al. |
| 2007/0043769 A1 | 2/2007 | Kasahara et al. |
| 2007/0073833 A1 | 3/2007 | Roy et al. |
| 2007/0106787 A1 | 5/2007 | Blumenau |
| 2007/0106792 A1 | 5/2007 | Blumenau |
| 2007/0112714 A1 | 5/2007 | Fairweather |
| 2007/0156532 A1 | 7/2007 | Nyhan et al. |
| 2007/0198327 A1 | 8/2007 | Yazdani et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2008/0004958 A1 | 1/2008 | Ralph et al. |
| 2008/0052392 A1 | 2/2008 | Webster et al. |
| 2008/0086356 A1 | 4/2008 | Glassman et al. |
| 2008/0086523 A1 | 4/2008 | Afergan et al. |
| 2008/0086524 A1 | 4/2008 | Afergan et al. |
| 2008/0086534 A1 | 4/2008 | Bardak |
| 2008/0086741 A1 | 4/2008 | Feldman et al. |
| 2008/0091639 A1 | 4/2008 | Davis et al. |
| 2008/0126420 A1 | 5/2008 | Wright et al. |
| 2008/0140476 A1 | 6/2008 | Anand et al. |
| 2008/0140525 A1 | 6/2008 | Lamsfuss et al. |
| 2008/0155588 A1 | 6/2008 | Roberts et al. |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0228808 A1 | 9/2008 | Kobara |
| 2008/0235243 A1 | 9/2008 | Lee et al. |
| 2008/0248815 A1 | 10/2008 | Busch |
| 2008/0250136 A1 | 10/2008 | Izrailevsky et al. |
| 2008/0276179 A1 | 11/2008 | Borenstein et al. |
| 2008/0288350 A1 | 11/2008 | Iris et al. |
| 2008/0300965 A1 | 12/2008 | Doe |
| 2008/0300974 A1 | 12/2008 | Bhandari |
| 2009/0019148 A1 | 1/2009 | Britton et al. |
| 2009/0024737 A1 | 1/2009 | Goldspink et al. |
| 2009/0024748 A1 | 1/2009 | Goldspink et al. |
| 2009/0030780 A1 | 1/2009 | York et al. |
| 2009/0055241 A1 | 2/2009 | Chen et al. |
| 2009/0055908 A1 | 2/2009 | Rapoport |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0083442 A1 | 3/2009 | Sutter et al. |
| 2009/0132579 A1 | 5/2009 | Kwang |
| 2009/0171762 A1 | 7/2009 | Alkove et al. |
| 2009/0217315 A1 | 8/2009 | Malik et al. |
| 2009/0253418 A1 | 10/2009 | Makinen |
| 2009/0259666 A1 | 10/2009 | Tola et al. |
| 2009/0271478 A1 | 10/2009 | Imai |
| 2009/0292587 A1 | 11/2009 | Fitzgerald |
| 2009/0293001 A1 | 11/2009 | Lu et al. |
| 2009/0307084 A1 | 12/2009 | Monighetti et al. |
| 2009/0327026 A1 | 12/2009 | Bistriceanu et al. |
| 2010/0004977 A1 | 1/2010 | Marci et al. |
| 2010/0010866 A1 | 1/2010 | Bal et al. |
| 2010/0024005 A1 | 1/2010 | Huang et al. |
| 2010/0057843 A1 | 3/2010 | Landsman et al. |
| 2010/0070621 A1 | 3/2010 | Urdan et al. |
| 2010/0082439 A9 | 4/2010 | Patel et al. |
| 2010/0088152 A1 | 4/2010 | Bennett |
| 2010/0088373 A1 | 4/2010 | Pinkham |
| 2010/0121676 A1 | 5/2010 | Jackson |
| 2010/0151816 A1* | 6/2010 | Besehanic ............ G06Q 30/02 455/405 |
| 2010/0153175 A1 | 6/2010 | Pearson et al. |
| 2010/0153544 A1 | 6/2010 | Krassner et al. |
| 2010/0161385 A1* | 6/2010 | Karypis ................ G06Q 10/04 709/224 |
| 2010/0161400 A1 | 6/2010 | Snodgrass et al. |
| 2010/0180013 A1 | 7/2010 | Shkedi |
| 2010/0191723 A1 | 7/2010 | Perez et al. |
| 2010/0198911 A1 | 8/2010 | Zhang |
| 2010/0205057 A1 | 8/2010 | Hook et al. |
| 2010/0211439 A1 | 8/2010 | Marci et al. |
| 2010/0235219 A1 | 9/2010 | Merrick et al. |
| 2010/0235241 A1* | 9/2010 | Wang ................ G06Q 30/0255 705/26.1 |
| 2010/0241745 A1 | 9/2010 | Offen |
| 2010/0257135 A1 | 10/2010 | Wolfe et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0312854 A1 | 12/2010 | Hyman |
| 2010/0313009 A1 | 12/2010 | Combet et al. |
| 2010/0325051 A1 | 12/2010 | Etchegoyen |
| 2011/0016482 A1 | 1/2011 | Tidwell et al. |
| 2011/0035256 A1 | 2/2011 | Shkedi et al. |
| 2011/0041062 A1 | 2/2011 | Singer et al. |
| 2011/0041168 A1 | 2/2011 | Murray et al. |
| 2011/0053513 A1 | 3/2011 | Papakostas et al. |
| 2011/0061000 A1 | 3/2011 | Andreasson |
| 2011/0087519 A1 | 4/2011 | Fordyce et al. |
| 2011/0087919 A1 | 4/2011 | Deshmukh et al. |
| 2011/0093327 A1 | 4/2011 | Fordyce et al. |
| 2011/0106620 A1 | 5/2011 | Setiawan et al. |
| 2011/0125593 A1 | 5/2011 | Wright et al. |
| 2011/0131294 A1 | 6/2011 | Shkedi |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0157475 A1 | 6/2011 | Wright et al. |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | Von Sydow et al. |
| 2011/0202500 A1 | 8/2011 | Warn et al. |
| 2011/0208860 A1 | 8/2011 | Sim et al. |
| 2011/0213956 A1 | 9/2011 | Mukkara et al. |
| 2011/0231240 A1 | 9/2011 | Schoen et al. |
| 2011/0246297 A1 | 10/2011 | Buchalter et al. |
| 2011/0246306 A1 | 10/2011 | Blackhurst et al. |

(56) References Cited

U.S. PATENT DOCUMENTS

| | | |
|---|---|---|
| 2011/0246641 A1 | 10/2011 | Pugh et al. |
| 2011/0264513 A1 | 10/2011 | Ratnaparkhi et al. |
| 2011/0276410 A1 | 11/2011 | Hjelm et al. |
| 2011/0276627 A1 | 11/2011 | Blechar et al. |
| 2011/0282730 A1 | 11/2011 | Tarmas |
| 2011/0288907 A1 | 11/2011 | Harvey et al. |
| 2011/0314114 A1 | 12/2011 | Young et al. |
| 2012/0005213 A1 | 1/2012 | Hannan et al. |
| 2012/0011262 A1 | 1/2012 | Cheng et al. |
| 2012/0017094 A1 | 1/2012 | Tulchinsky et al. |
| 2012/0030037 A1 | 2/2012 | Carriero |
| 2012/0042005 A1 | 2/2012 | Papakostas et al. |
| 2012/0072469 A1 | 3/2012 | Perez et al. |
| 2012/0109709 A1 | 5/2012 | Fordyce et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0116873 A1 | 5/2012 | Damm et al. |
| 2012/0124202 A1 | 5/2012 | Cooper et al. |
| 2012/0136704 A1 | 5/2012 | Carlson et al. |
| 2012/0143713 A1 | 6/2012 | Dittus et al. |
| 2012/0151079 A1 | 6/2012 | Besehanic et al. |
| 2012/0151322 A1 | 6/2012 | Lindsay et al. |
| 2012/0158490 A1 | 6/2012 | Neumeyer et al. |
| 2012/0158954 A1 | 6/2012 | Heffernan et al. |
| 2012/0166520 A1 | 6/2012 | Lindsay et al. |
| 2012/0173701 A1 | 7/2012 | Tenbrock |
| 2012/0185274 A1 | 7/2012 | Hu |
| 2012/0192214 A1 | 7/2012 | Hunn et al. |
| 2012/0206331 A1 | 8/2012 | Gandhi |
| 2012/0209920 A1 | 8/2012 | Neystadt et al. |
| 2012/0215621 A1 | 8/2012 | Heffernan et al. |
| 2012/0239407 A1 | 9/2012 | Lynch et al. |
| 2012/0239809 A1 | 9/2012 | Mazumdar et al. |
| 2012/0254466 A1 | 10/2012 | Jungck |
| 2012/0265606 A1 | 10/2012 | Patnode |
| 2012/0302222 A1 | 11/2012 | Williamson et al. |
| 2012/0303454 A1 | 11/2012 | Gupta |
| 2012/0310729 A1 | 12/2012 | Dalto et al. |
| 2012/0311017 A1 | 12/2012 | Sze et al. |
| 2013/0007794 A1 | 1/2013 | Besehanic et al. |
| 2013/0013308 A1 | 1/2013 | Cao et al. |
| 2013/0014144 A1 | 1/2013 | Bhatia et al. |
| 2013/0019262 A1 | 1/2013 | Bhatia et al. |
| 2013/0046615 A1 | 2/2013 | Liyanage |
| 2013/0046651 A1 | 2/2013 | Edson |
| 2013/0060629 A1 | 3/2013 | Rangsikitpho et al. |
| 2013/0066713 A1 | 3/2013 | Umeda |
| 2013/0080263 A1 | 3/2013 | Goldman et al. |
| 2013/0086179 A1 | 4/2013 | Coleman et al. |
| 2013/0097311 A1 | 4/2013 | Mazumdar et al. |
| 2013/0097312 A1 | 4/2013 | Mazumdar et al. |
| 2013/0117103 A1 | 5/2013 | Shimizu et al. |
| 2013/0124628 A1 | 5/2013 | Weerasinghe |
| 2013/0138506 A1 | 5/2013 | Zhu et al. |
| 2013/0138743 A1 | 5/2013 | Amento et al. |
| 2013/0145022 A1 | 6/2013 | Srivastava et al. |
| 2013/0159499 A1 | 6/2013 | Besehanic |
| 2013/0198125 A1 | 8/2013 | Oliver et al. |
| 2013/0204694 A1 | 8/2013 | Banister et al. |
| 2013/0212188 A1 | 8/2013 | Duterque et al. |
| 2013/0238745 A1 | 9/2013 | Ramachandran et al. |
| 2013/0246389 A1 | 9/2013 | Osann, Jr. |
| 2013/0246609 A1 | 9/2013 | Topchy et al. |
| 2013/0282898 A1 | 10/2013 | Kalus et al. |
| 2013/0290070 A1 | 10/2013 | Abraham et al. |
| 2013/0297411 A1 | 11/2013 | Van Datta et al. |
| 2013/0325588 A1 | 12/2013 | Kalyanam et al. |
| 2013/0331971 A1 | 12/2013 | Bida et al. |
| 2013/0332604 A1 | 12/2013 | Seth et al. |
| 2013/0346172 A1 | 12/2013 | Wu |
| 2013/0347016 A1 | 12/2013 | Rowe |
| 2014/0026158 A1 | 1/2014 | Rowe et al. |
| 2014/0033317 A1 | 1/2014 | Barber |
| 2014/0075004 A1 | 3/2014 | Van Dusen et al. |
| 2014/0095702 A1 | 4/2014 | Kalus et al. |
| 2014/0108130 A1 | 4/2014 | Vos et al. |
| 2014/0122703 A1 | 5/2014 | Pugh et al. |
| 2014/0156761 A1 | 6/2014 | Heffernan et al. |
| 2014/0164447 A1 | 6/2014 | Tarafdar et al. |
| 2014/0250223 A1 | 9/2014 | Heffernan |
| 2014/0279045 A1 | 9/2014 | Shottan |
| 2014/0279074 A1 | 9/2014 | Chen et al. |
| 2014/0298025 A1 | 10/2014 | Burbank et al. |
| 2014/0324544 A1 | 10/2014 | Donato et al. |
| 2014/0324545 A1 | 10/2014 | Splaine et al. |
| 2014/0337104 A1 | 11/2014 | Splaine et al. |
| 2015/0019322 A1 | 1/2015 | Alla et al. |
| 2015/0019327 A1 | 1/2015 | Mazumdar et al. |
| 2015/0046579 A1 | 2/2015 | Perez et al. |
| 2015/0089354 A1 | 3/2015 | Abrahami et al. |
| 2015/0186403 A1 | 7/2015 | Srivastava et al. |
| 2015/0189500 A1 | 7/2015 | Bosworth et al. |
| 2015/0193816 A1 | 7/2015 | Toupet et al. |
| 2015/0262207 A1 | 9/2015 | Rao et al. |
| 2016/0021204 A1 | 1/2016 | Seth et al. |
| 2016/0173693 A1 | 6/2016 | Spievak et al. |
| 2016/0275548 A1 | 9/2016 | Raman et al. |
| 2016/0359989 A1 | 12/2016 | Aycock |
| 2017/0126518 A1 | 5/2017 | Kalus et al. |
| 2017/0154366 A1 | 6/2017 | Turgeman |
| 2018/0255151 A1 | 9/2018 | Seth et al. |
| 2018/0295199 A1 | 10/2018 | Heffernan et al. |
| 2020/0153916 A1 | 5/2020 | Seth et al. |
| 2021/0274006 A1 | 9/2021 | Kalus et al. |
| 2022/0103646 A1 | 3/2022 | Heffernan |
| 2022/0272170 A1 | 8/2022 | Seth et al. |

FOREIGN PATENT DOCUMENTS

| | | |
|---|---|---|
| AU | 2011349435 A1 | 5/2013 |
| AU | 2013205736 A1 | 5/2013 |
| AU | 2013205736 B2 | 7/2014 |
| AU | 2011349435 B2 | 8/2016 |
| AU | 2016259351 A1 | 12/2016 |
| AU | 2018201461 A1 | 3/2018 |
| CA | 2819268 A1 | 6/2012 |
| CA | 2891268 A1 | 11/2016 |
| CA | 2819268 C | 10/2017 |
| CN | 1898662 A | 1/2007 |
| CN | 101222348 A | 7/2008 |
| CN | 101222349 A | 7/2008 |
| CN | 101297315 A | 10/2008 |
| CN | 101505247 A | 8/2009 |
| CN | 102006605 A | 4/2011 |
| CN | 101222348 B | 5/2011 |
| CN | 101536503 B | 9/2012 |
| CN | 101077014 B | 9/2013 |
| CN | 103329162 A | 9/2013 |
| CN | 103473721 A | 12/2013 |
| CN | 104584564 A | 4/2015 |
| CN | 103329162 B | 11/2015 |
| CN | 103473721 B | 4/2017 |
| CN | 104541513 B | 7/2018 |
| CN | 104520839 B | 1/2019 |
| EP | 0325219 A2 | 7/1989 |
| EP | 0703683 A2 | 3/1996 |
| EP | 0744695 A2 | 11/1996 |
| EP | 0744695 B1 | 7/2002 |
| EP | 1379044 A1 | 1/2004 |
| GB | 2176639 A | 12/1986 |
| JP | H05324352 A | 12/1993 |
| JP | H07262167 A | 10/1995 |
| JP | H10124428 A | 5/1998 |
| JP | H10260955 A | 9/1998 |
| JP | 2000357141 A | 12/2000 |
| JP | 2001282982 A | 10/2001 |
| JP | 2001357192 A | 12/2001 |
| JP | 2002025628 A | 1/2002 |
| JP | 2002056280 A | 2/2002 |
| JP | 2002163562 A | 6/2002 |
| JP | 2002216009 A | 8/2002 |
| JP | 2002373152 A | 12/2002 |
| JP | 2003067289 A | 3/2003 |

(56) References Cited

FOREIGN PATENT DOCUMENTS

| | | |
|---|---|---|
| JP | 2003345940 A | 12/2003 |
| JP | 2004504674 A | 2/2004 |
| JP | 2004302956 A | 10/2004 |
| JP | 2006127320 A | 5/2006 |
| JP | 2006127321 A | 5/2006 |
| JP | 2008511057 A | 4/2008 |
| JP | 2008524749 A | 7/2008 |
| JP | 2008234641 A | 10/2008 |
| JP | 2009043019 A | 2/2009 |
| JP | 2009259119 A | 11/2009 |
| JP | 2010039845 A | 2/2010 |
| JP | 2010512599 A | 4/2010 |
| JP | 2010529541 A | 8/2010 |
| JP | 2010257448 A | 11/2010 |
| JP | 2010282561 A | 12/2010 |
| JP | 2011258212 A | 12/2011 |
| JP | 2012093970 A | 5/2012 |
| JP | 2012518225 A | 8/2012 |
| JP | 2013544384 A | 12/2013 |
| JP | 5730407 B2 | 6/2015 |
| JP | 5867945 B2 | 2/2016 |
| JP | 2016095866 A | 5/2016 |
| JP | 6095760 B2 | 3/2017 |
| JP | 6325704 B2 | 5/2018 |
| JP | 6608989 B2 | 11/2019 |
| JP | 6870901 B2 | 5/2021 |
| KR | 20020037980 A | 5/2002 |
| KR | 20090020558 A | 2/2009 |
| KR | 20090081422 A | 7/2009 |
| KR | 20100094021 A | 8/2010 |
| KR | 20110017895 A | 2/2011 |
| KR | 20110023293 A | 3/2011 |
| KR | 20120091411 A | 8/2012 |
| KR | 20120123148 A | 11/2012 |
| WO | 9517457 A1 | 6/1995 |
| WO | 9600950 A1 | 1/1996 |
| WO | 9617467 A2 | 6/1996 |
| WO | 9628904 A1 | 9/1996 |
| WO | 9632815 A2 | 10/1996 |
| WO | 9637983 A1 | 11/1996 |
| WO | 9641495 A1 | 12/1996 |
| WO | 9809447 A2 | 3/1998 |
| WO | 2000041115 A1 | 7/2000 |
| WO | 0154034 A1 | 7/2001 |
| WO | 2001052168 A1 | 7/2001 |
| WO | 2002007054 A2 | 1/2002 |
| WO | 2003027860 A1 | 4/2003 |
| WO | 2005013072 A2 | 2/2005 |
| WO | 2005024689 A1 | 3/2005 |
| WO | 2006023765 A2 | 3/2006 |
| WO | 2006068969 A2 | 6/2006 |
| WO | 2007003683 A1 | 1/2007 |
| WO | 2007092050 A2 | 8/2007 |
| WO | 2008150575 A2 | 12/2008 |
| WO | 2008151076 A1 | 12/2008 |
| WO | 2009117733 A2 | 9/2009 |
| WO | 2010083450 A2 | 7/2010 |
| WO | 2010088372 A1 | 8/2010 |
| WO | 2010104285 A2 | 9/2010 |
| WO | 2011097624 A2 | 8/2011 |
| WO | 2012019643 A1 | 2/2012 |
| WO | 2012040371 A1 | 3/2012 |
| WO | 2012087954 A2 | 6/2012 |
| WO | 2012128895 A2 | 9/2012 |
| WO | 2012170902 A1 | 12/2012 |
| WO | 2012177866 A2 | 12/2012 |
| WO | 2013122907 A1 | 8/2013 |
| WO | 2013188429 A2 | 12/2013 |
| WO | 2014059319 A2 | 4/2014 |
| WO | 2014176343 A1 | 10/2014 |
| WO | 2014179218 A1 | 11/2014 |
| WO | 2014182764 A1 | 11/2014 |
| WO | 2015005957 A1 | 1/2015 |
| WO | 2015023589 A1 | 2/2015 |
| WO | 2015102796 A1 | 7/2015 |
| WO | 2015102803 A1 | 7/2015 |

OTHER PUBLICATIONS

United States Patent and Trademark Office, "Final Office Action," issued in connection with U.S. Appl. No. 15/933,054, issued Feb. 5, 2021, 22 pages.

Canadian Intellectual Property Office, "Notice of Allowance," mailed in connection with Canadian patent appl. No. 2,977,942, dated Feb. 12, 2021, 1 page.

United States Patent and Trademark Office, "Notice of Allowance," issued in U.S. Appl. No. 16/792,766, mailed on Feb. 17, 2021, 2 pages.

Japanese Patent Office, Decision to Grant a Patent'," issued in connection with Japanese Patent Application No. 2019-193447, dated Mar. 16, 2021, 5 pages. [English Translation Included.].

Australian Government, IP Australia, "Patent Examination Report No. 1," issued in connection with AU Application No. 2020210157, issued on Apr. 30, 2021, 3 pages.

United States Patent and Trademark Office, "Notice of Allowance," issued in connection with U.S. Appl. No. 18/068,262, mailed on Jun. 1, 2023, 2 pages.

United States Patent and Trademark Office, "Notice of Allowance," issued in connection with U.S. Appl. No. 15/933,054, dated Aug. 26, 2021, 10 pages.

Australian Government, IP Australia, "Notice of Acceptance," issued in connection with AU Application No. 2020210157, issued on Sep. 3, 2021, 3 pages.

United States Patent and Trademark Office, "Supplemental Notice of Allowance," issued in connection with U.S. Appl. No. 15/933,054, dated Sep. 7, 2021, 5 pages.

United States Patent and Trademark Office, "Supplemental Notice of Allowance," issued in connection with U.S. Appl. No. 15/933,054, dated Nov. 5, 2021, 2 pages.

Australian Patent Office, "Notice of Grant," issued in connection with Australian Patent Application No. 2020210157, dated Jan. 6, 2022, 1 page.

United States Patent and Trademark Office, "Notice of Allowance," issued in connection with U.S. Appl. No. 17/199,139, dated Apr. 11, 2022, 7 pages.

United States Patent and Trademark Office, "Non-Final Office Action", issued in connection with U.S. Appl. No. 17/545,740, dated May 11, 2023, 38 pages.

Japanese Patent Office, "Notice of Reasons for Rejection," issued in connection with Japanese Patent Application No. 2021-067625, mailed on May 31, 2022, 11 Pages. [English translation included].

United States Patent and Trademark Office, "Notice of Allowance," issued in connection with U.S. Appl. No. 17/199,139, dated Aug. 11, 2022, 5 pages.

Canadian Patent Office, "Examiner's Report," issued in connection with Canadian Patent Application No. 3,122,203, mailed on Sep. 20, 2022, 3 pages.

United States Patent and Trademark Office, "Notice of Allowance," issued in connection with U.S. Appl. No. 17/199,139, dated Oct. 14, 2022, 2 pages.

Canadian Patent Office, "Office Action," issued in connection with CA Patent Application No. 3,122,203, mailed on May 9, 2023, 3 pages.

Japanese Patent Office, "Final Rejection," issued in connection with Japanese Patent Application No. 2021-067625, mailed on Dec. 13, 2022, 12 pages. [English translation included].

United States Patent and Trademark Office, "Notice of Allowance," issued in connection with U.S. Appl. No. 18/068,262, mailed on Apr. 24, 2023, 7 pages.

United States Patent and Trademark Office, "Final Office Action," mailed in connection with U.S. Appl. No. 13/404,984, dated Feb. 1, 2016, 17 pages.

United States Patent and Trademark Office, "Non-Final Office Action," issued in connection with U.S. Appl. No. 13/921,962, dated Feb. 25, 2016, 7 pages.

(56) References Cited

OTHER PUBLICATIONS

Australian Government, IP Australia, "Patent Examination Report No. 2," issued in connection with AU Application No. 2011349435, issued on Mar. 1, 2016, 5 pages.
Canadian Patent Office, "Office Action," issued in connection with CA Patent Application No. 2,819,268, mailed on Mar. 15, 2016, 6 pages.
European Patent Office, "Communication pursuant to Article 94(3) EPC," issued in connection with European Application No. 11850570.0, dated May 3, 2016, 5 pages.
Australian Government, IP Australia,"Patent Examination Report No. 3," issued in connection with AU Application No. 2011349435, issued on Jun. 9, 2016, 4 pages.
The State Intellectual Property Office of the People's Republic of China,, "Second Office Action," issued in connection with China Patent Application No. 201310338209.4, dated Jul. 20, 2016, 7 Pages.
Australian Government, IP Australia,"Patent Examination Report No. 4," issued in connection with AU Application No. 2011349435, issued on Aug. 1, 2016, 5 pages.
Australian Government, IP Australia,"Notice of Acceptance," issued in connection with AU Application No. 2011349435, issued on Aug. 5, 2016, 2 pages.
United States Patent and Trademark Office, "Notice of Allowance," issued in U.S. Appl. No. 16/792,766, mailed on Dec. 2, 2020, 2 pages.
United States Patent and Trademark Office, "Notice of Allowance," issued in connection with U.S. Appl. No. 13/921,962, on Sep. 27, 2016, 9 pages.
United States Patent and Trademark Office, "Non-Final Office Action," issued in connection with U.S. Appl. No. 13/404,984, dated Oct. 19, 2016, 36 pages.
Australian Patent Office, "Notice of Grant," issued in connection with Australian Patent Application No. 2011349435, dated Dec. 1, 2016, 1 page.
China National Intellectual Property Administration, "Notice of Allowance," in connection with chinese patent appl. No. 20130338209, dated Dec. 13, 2016, 4 pages.
Japanese Patent Office, "Notice of Allowance," issued in connection with Japanese Patent Application No. 2015-256568, dated Jan. 17, 2017, 7 pages (English language machine translation included).
United States Patent and Trademark Office, "Supplemental Notice of Allowance", issued in connection with U.S. Appl. No. 13/921,962, dated Feb. 2, 2017, 2 pages.
Canadian Intellectual Property Office, "Notice of Allowance," mailed in connection with Canadian patent appl. No. 2,819,268 dated Mar. 27, 2017, 1 page.
United States Patent and Trademark Office, "Non-Final Office Action," issued in connection with U.S. Appl. No. 13/404,984, dated May 15, 2017, 36 Pages.
United States Patent and Trademark Office, "Non-final Office Action," issued in connection with U.S. Appl. No. 15/409,281, dated May 19, 2017, 8 pages.
Australian Government, IP Australia,"Patent Examination Report No. 1," issued in connection with AU Application No. 2016259351, issued on Jun. 15, 2017, 3 pages.
Australian Government, IP Australia,"Patent Examination Report No. 2," issued in connection with AU Application No. 2016259351, issued on Aug. 9, 2017, 3 pages.
Australian Government, IP Australia,"Notice of Acceptance," issued in connection with AU Application No. 2016259351, issued on Nov. 24, 2017, 3 pages.
Japanese Patent Office, "Notice of Reasons for Refusal", issued in connection with Japanese Patent Application No. 2017-025262, dated Dec. 12, 2017, 6 pages. [English Translation Included.].
United States Patent and Trademark Office, "Final Office Action," issued in connection with U.S. Appl. No. 13/404,984, dated Dec. 27, 2017, 25 Pages.

United States Patent and Trademark Office, "Supplemental Notice of Allowance," issued in connection with U.S. Appl. No. 15/409,281, dated Jan. 24, 2018, 7 pages.
Japanese Patent Office, "Decision to Grant a Patent", issued in connection with Japanese Patent Application No. 2017-025262, dated Mar. 13, 2018, 5 pages. [English Translation Included].
Australian Patent Office, "Notice of Grant," issued in connection with Australian Patent Application No. 2016259351, dated Mar. 22, 2018, 1 page.
Canadian Patent Office, "Examiner's Report," issued in connection with CA Patent Application No. 2,977,942, mailed on Jun. 18, 2018, 4 pages.
United States Patent and Trademark Office, "Non-Final Office Action," issued in connection with U.S. Appl. No. 15/966,195, dated Sep. 4, 2018, 8 pages.
United States Patent and Trademark Office, "Notice of Allowance," issued in connection with U.S. Appl. No. 15/966,195, dated Dec. 20, 2018, 5 pages.
Japanese Patent Office, "Notice of Reasons for Refusal", issued in connection with Japanese Patent Application No. 2018-076946, dated Mar. 5, 2019, 6 pages. [English Translation Included].
United States Patent and Trademark Office, "Notice of Allowability," issued in connection with U.S. Appl. No. 15/966,195, dated Mar. 27, 2019, 2 pages.
Canadian Patent Office, "Examiner's Report/Office Action," issued in connection with CA Patent Application No. 2,977,942, mailed on May 2, 2019, 4 pages.
European Patent Office, "Communication pursuant to Article 94(3) EPC,". issued in connection with European Patent Application No. 11850570.0, dated May 3, 2019, 5 pages.
Japanese Patent Office, "Notice of Reasons for Refusal", issued in connection with Japanese Patent Application No. 2019-193447, dated Nov. 4, 2020, 8 pages. [English Translation Included.].
Japanese Patent Office, "Written Opinion," issued in connection with Japanese Patent Application No. 2018-076946, dated Jun. 7, 2019, 6 pages. [English Translation Included.].
European Patent Office, "Decision to refuse a European Patent Application," issued in connection with European Application No. 11850570.0, dated Jul. 24, 2019, 17 pages.
Australian Government, IP Australia,"Patent Examination Report No. 1," issued in connection with AU Application No. 2018201461, issued on Aug. 6, 2019, 3 pages.
Japanese Patent Office, "Decision to Grant a Patent", issued in connection with Japanese Patent Application No. 2018-076946, dated Sep. 24, 2019, 5 pages. [English Translation Included.].
United States Patent and Trademark Office, "Notice of Allowance and Fee(s) Due," mailed in connection with U.S. Appl. No. 16/364,961, dated Oct. 3, 2019, 8 pages.
United States Patent and Trademark Office, "Non-Final Office Action", issued in connection with U.S. Appl. No. 15/933,054, dated Nov. 12, 2019, 21 pages.
Australian Government, IP Australia,"Patent Examination Report No. 2," issued in connection with AU Application No. 2018201461, issued on Feb. 5, 2020, 3 pages.
United States Patent and Trademark Office, "Final Office Action", issued in connection with U.S. Appl. No. 15/933,054, dated Mar. 26, 2020, 23 pages.
Australian Government, IP Australia,"Notice of Acceptance," issued in connection with AU Application No. 2018201461, issued on Apr. 17, 2020, 3 pages.
Canadian Patent Office, "Examiner's Report," issued in connection with CA Patent Application No. 2,977,942, mailed on Apr. 22, 2020, 4 pages.
Australian Government, IP Australia,"Notice of Grant," issued in connection with AU Application No. 2018201461, issued on Aug. 13, 2020, 1 page.
United States Patent and Trademark Office, "Non-Final Office Action", issued in connection with U.S. Appl. No. 15/933,054, dated Sep. 24, 2020, 19 pages.
United States Patent and Trademark Office, "Notice of Allowance," issued in U.S. Appl. No. 16/792,766, mailed on Oct. 6, 2020, 9 pages.

(56) References Cited

OTHER PUBLICATIONS

The State Intellectual Property Office of the People's Republic of China, "First Office Action," issued in connection with China Patent Application No. 201310338209.4, dated Dec. 22, 2015, 19 Pages.
Coffey, "Internet Audience Measurement: A Practitioner's View," Journal of Interactive Advertising, vol. 1, No. 2, Spring 2001, pp. 10-17.
Japan Patent Office, "Decision to Grant a Patent," issued on connection with Japanese Patent Application No. 2015-078539, mailed Dec. 8, 2015, 5 Pages. [English Translation Included].
McGeer et al.,"The Media Messenger," Proceedings of the Third International Conference on Creating, Connecting and Collaborating through Computing , 2005, 7 pages.
Pouttu-Clarke, "Cross Domain Cookie Provider," available Jan. 19, 2005, retrieved from the Internet Nov. 28, 2017 [http://www.theserverside.com/discussions/thread/31258.html] 10 pages.
JavaScript and .AJAX Forum. Sep. 28, 2005. [ retrieved from Internet at http:/www.webmasterworld.com/forum91/4465, htm on Jun. 29, 2011] 4 pages.
Adam et al., "Privacy Preserving Integration of Health Care Data," AMIA 2007 Symposium Proceedings, Feb. 2007, 6 pages.
Wikipedia, "Mental Poker," Jan. 12, 2010, [retrieved from Internet at http://en.wikipedia.org/wiki/Mental poker on Sep. 21, 2010], 5 pages.
Vsvaidya, "Cookie Syncing," Admonsters, retrieved from: <https://www.admonsters.com/cookie-synching/> dated Apr. 20, 2010, 11 pages.
Vranica, "Nielsen Testing a New Web-Ad Metric," The Wall Street Journal, Sep. 23, 2010, 2pages.
Vega, Tanzina, "Nielsen Introduces New Ad Measurement Product," The New York Times, Sep. 27, 2010, 7 pages.
Protalinski, "Facebook denies cookie tracking allegations," retrieved from Internet Article, dated Sep. 25, 2011, 2 pages.
Cubrilovic, "Logging out of Facebook is not enough," retrieved from: <www.nikcnb.appspot.com>, dated Sep. 25, 2011, 3 pages.
Protalinski, "Facebook fixes cookie behavior after logging out," internet article, retrieved from: www.zdnet.com, dated Sep. 27, 2011, 2 pages.
Albanesius, "Facebook Issues Fix for Several Tracking Cookies," retrieved from: <www.pcmag.com>, dated Sep. 28, 2011, 2 pages.
Protalinski, "US congressmen ask FTC to investigate Facebook cookies," retrieved from: <www.zdnet.com>, dated Sep. 28, 2011, 2 pages.
Jakobsson et at, "How Things Work and Fail," The Death of the Internet, Chapter 4, John Wiley & Sons, Inc., 2012,112 pages.
The Nielsen Company, "Nielsen Unveils New Online Advertising Measurement," Sep. 27, 2010, [retrieved from Internet at http ://nielsen.com/us/en/insights /press-room/2010/nielsen_unveils_ newonlineadvertisingmeasurement.html on May 31, 2012], 3 pages.
International Searching Authority, "International Search Report," issued in connection with International Application No. PCT/US2011/065881, mailed on Jul. 9, 2012, 2 pages.
International Searching Authority, "Written Opinion," issued in connection with application No. PCT/US2011/065881, Jul. 9, 2012, 6 pages.
Launder, "Media Journal: Nielsen to Test Online-TV Viewing Tool," The Wall Street Journal, Apr. 30, 2013, 2 pages.
Sharma, "Nielsen Gets Digital to Track Online TV Viewers," All Things, Apr. 30, 2013, 1 page.
Rainier, "Why Businesses Should Use Google Plus," The Social Media Guide, retrieved from: <thesocialmediaguide.com/social_ media/why-businesses-should-use-google-plus>, retrieved on May 7, 2013, 9 pages.
Rapleaf, "The Consumer Data Marketplace," www.rapleaf.com/ under-the-hood/, retrieved on May 7, 2013, 2 pages.
Fliptop, "Fliptop Person API Documentation," retrieved from: <https://developer.fliptop.com/documentation>, retrieved May 7, 2013, 6 pages.
Fliptop, "Get Keep and Grow Customers with Fliptop's Customer Intelligence, Application," www.fliptop.com/features_social_matching_ retrieved May 7, 2013, 3 pages.
Fliptop, "What is Fliptop?", retrieved from: <www.fliptop.com/ about_us>, retrieved May 7, 2013, 1 page.
Rapleaf, "Frequently Asked Questions," www.rapleaf.com/about-us/faq/#where, retrieved on May 7, 2013, 3 pages.
Rapleaf, "Fast. Simple. Secure," www.rapleaf.com/why-rapleaf/, retrieved on May 7, 2013, 3 pages.
International Searching Authority, "International Preliminary Report on Patentability," mailed in connection with International Application No. PCT/US2011/065881, dated Jun. 25, 2013, 7 pages.
State Intellectual Property Office of China, "Search Report," issued in connection with Chinese Application No. 201180061437.0, dated Feb. 27, 2014, 2 pages.
The State Intellectual Property Office of the People's Republic of China, "First Office Action," issued in connection with China Patent Application No. 201180061437.0, dated Mar. 7, 2014, 4 Pages.
European Patent Office, "Extended Search Report," issued in connection with European Patent Application No. 11850570.0, dated Apr. 25, 2014, 5 pages.
Japanese Patent Office, "Notice of Reasons for Refusal", issued in connection with Japanese Patent Application No. 2013-546286, dated Aug. 26, 2014 (6 pages.) [English Translation Provided].
United States Patent and Trademark Office, "Notice of Allowance" issued in connection with U.S. Appl. No. 13/995,864, dated Oct. 28, 2014, 9 pages.
IP Australia, "Patent Examination Report No. 1," issued in connection with Australian Patent Application No. 2011349435, dated Nov. 4, 2014, 3 pages.
The State Intellectual Property Office of the People's Republic of China, "Second Office Action," issued in connection with China Patent Application No. 201180061437.0, dated Nov. 15, 2014, 8 Pages.
Canadian Intellectual Property Office, "Office Action," issued in connection with Canadian Patent Application No. 2,819,269, Nov. 24, 2014, 4 pages.
Japanese Patent Office, "Written Opinion", issued in connection with Japanese Patent Application No. 2013-546286, dated Nov. 25, 2014, 4 pages. [English Translation Provided].
United States Patent and Trademark Office, "Notice of Allowance" issued in U.S. Appl. No. 13/995,864, mailed on Dec. 5, 2014, 2 pages.
United States Patent and Trademark Office, "Notice of Allowance" issued in U.S. Appl. No. 13/995,864, mailed on Dec. 22, 2014, 2 pages.
United States Patent and Trademark Office, "Notice of Allowance" issued in U.S. Appl. No. 13/995,864, mailed on Jan. 6, 2015, 2 pages.
Japanese Patent Office, "Decision to Grant a Patent", issued in connection with Japanese Patent Application No. 2013-546286, dated Mar. 10, 2015, 5 pages. [English Translation Provided].
United States Patent and Trademark Office, "Non-Final Office Action," issued in connection with U.S. Appl. No. 13/404,984, dated May 20, 2015, 10 pages.
Japan Patent Office, "Notice of Reasons for Refusal," issued in connection with Japanese Patent Application No. 2015-078539, mailed on Jul. 14, 2015, 6 Pages. [English Translation Included].
The State Intellectual Property Office of the People's Republic of China, "Notice to Grant," issued in connection with China Patent Application No. 201180061437.0, dated Jul. 27, 2015, 3 pages. [English translation only].
United States Patent and Trademark Office, "Non-Final Office Action", issued in connection with U.S. Appl. No. 13/921,962, filed Dec. 1, 2015, 5 pages.
Storing and Retrieving non 3rd Party Cookies Across Multiple Domains, Google Answers, Jun. 30, 2006, retrieved from http:// answers.google.com/answers/threadview/id/742376.html, 3 pages.
Arbitron, The Infinite Dial 2011: Navigating Digital Platforms, Edison Research, 2011, 83 pages.
Enoch et al., Cracking the Cross-Media Code: How to Use Single-Source Measures to Examine Media , Cannibalization and Convergence, Journal of Advertising Research, Jun. 1, 2010, 13 pages.

(56) References Cited

OTHER PUBLICATIONS

Facebook, Measuring Conversions on Facebook, Across Devices and in Mobile Apps, Aug. 2014, 3 pages.

Goerg et al., How Many Millenials Visit YouTube? Estimating Unobserved Events From Incomplete Panel Data Conditioned on Demographic Covariates, Apr. 27, 2015, 27 pages, Google Inc.

Goerg et al., How Many People Visit YouTube? Imputing Missing Events in Panels With Excess Zeros, 2015, 6 pages, Google Inc.

Headen et al., The Duplication of Viewing Law and Television Media Schedule Evaluation, Journal of Marketing and Reasearch, vol. XVI, Aug. 1979, 333-40, 9 pages.

Hothorn, Unbiased Recursive Partitioning: A Conditional Inference Framework, Journal of Computational and Graphical Statistics, vol. 15, No. 3, pp. 651-674, copyright 2006 American Statistical Association, Institute of Mathematical Statistics, and Interface Foundation of North America, 25 pages.

Huang et al., Modeling the Audience's Banner ad Exposure for Internet Advertising Planning, Journal of Advertising, vol. 35, No. 2, Summer 2006, pp. 123-136, 15 pages.

Jim Edwards, Apple Wants More Advertisers to Use Its iPhone Tracking System, Business Insider, Jun. 13, 2013, 2 pages.

Peter J. Danaher, A Canonical Expansion Model for Multivariate Media Exposure Distributions: A Generalization of the Duplication of Viewing Law, Journal of Marketing Research, Aug. 1991, 8 pages.

Rust et al., A Comparative Study of Television Duplication Models, Journal for Advertising, vol. 10, No. 3, 1981, 6 pages.

Samantha Braverman, Are the Online Marketing Efforts of TV Shows and Programs Worthwhile?, Mar. 30, 2011, 10 pages.

Nielsen Unveils New Online Advertising Measurement, The Nielsen Company, Sep. 27, 2010, Retrieved from Internet at http://nielsen.com/us/en/insights/pressroom/2010/nielsen_unveils_newonlineadvertisingmeasurement.html on May 31, 2012, 4 Pages.

Nielsen, How Teens Use Media: A Nielsen Report on the Myths and Realities of Teem Media Trends, Jun. 2009, 17 pages.

United States Patent and Trademark Office, "Non-Final Rejection," issued in connection with U.S. Appl. No. 13/404,984, mailed on May 20, 2015, 10 pages.

United States Patent and Trademark Office, "Final Rejection," issued in connection with U.S. Appl. No. 13/404,984, mailed on Feb. 1, 2016, 17 pages.

United States Patent and Trademark Office, "Non-Final Rejection," issued in connection with U.S. Appl. No. 13/404,984, mailed on Oct. 19, 2016, 36 pages.

United States Patent and Trademark Office, "Non-Final Rejection," issued in connection with U.S. Appl. No. 13/404,984, mailed on May 15, 2017, 36 pages.

United States Patent and Trademark Office, "Final Rejection," issued in connection with U.S. Appl. No. 13/404,984, mailed on Dec. 27, 2017, 25 pages.

United States Patent and Trademark Office, "Non-Final Rejection," issued in connection with U.S. Appl. No. 15/933,054, mailed on Nov. 12, 2019, 21 pages.

United States Patent and Trademark Office, "Final Rejection," issued in connection with U.S. Appl. No. 15/933,054, mailed on Mar. 26, 2020, 23 pages.

United States Patent and Trademark Office, "Non-Final Rejection," issued in connection with U.S. Appl. No. 15/933,054, mailed on Sep. 24, 2020, 19 pages.

United States Patent and Trademark Office, "Final Rejection," issued in connection with U.S. Appl. No. 15/933,054, mailed on Feb. 5, 2021, 22 pages.

United States Patent and Trademark Office, "Non-Final Rejection," issued in connection with U.S. Appl. No. 17/545,740, mailed on May 11, 2023, 38 pages.

United States Patent and Trademark Office, "Requirement for Restriction/Election," issued in connection with U.S. Appl. No. 13/915,381, mailed on Oct. 8, 2014, 06 pages.

United States Patent and Trademark Office, "Non-Final Rejection," issued in connection with U.S. Appl. No. 13/915,381, mailed on Jan. 30, 2015, 07 pages.

United States Patent and Trademark Office, "Non-Final Rejection," issued in connection with U.S. Appl. No. 14/871,630, mailed on Feb. 9, 2017, 08 pages.

United States Patent and Trademark Office, "Non-Final Rejection," issued in connection with U.S. Appl. No. 15/974,472, mailed on Mar. 14, 2019, 07 pages.

United States Patent and Trademark Office, "Non-Final Rejection," issued in connection with U.S. Appl. No. 16/740,046, mailed on Nov. 13, 2020, 05 pages.

United States Patent and Trademark Office, "Final Rejection," issued in connection with U.S. Appl. No. 16/740,046, mailed on Jun. 2, 2021, 06 pages.

United States Patent and Trademark Office, "Non-Final Rejection," issued in connection with U.S. Appl. No. 16/740,046, mailed on Sep. 29, 2021, 06 pages.

United States Patent and Trademark Office, "Non-Final Rejection," issued in connection with U.S. Appl. No. 17/743,220, mailed on Nov. 8, 2022, 13 pages.

United States Patent and Trademark Office, "Final Rejection," issued in connection with U.S. Appl. No. 17/743,220, mailed on Mar. 16, 2023, 10 pages.

* cited by examiner

236 →

| AME USER ID 502 | PARTNER USER ID 504 | LOGIN TIMESTAMP 506 |
|---|---|---|
| 123 | TOM | 01-01-2010 12:57 AM |
| 123 | MARY | 01-01-2010 3:00 PM |
| 123 | TOM | 01-01-2010 6:00 PM |
| 456 | TOM | 01-01-2010 8:00 PM |

PARTNER COOKIE MAP

| AME USER ID 602 | TIMESTAMP 604 | CAMPAIGN ID 606 | SITE ID 608 |
|---|---|---|---|
| 123 | 01-01-2010 1:57 AM | A0893B | 325 |
| 123 | 01-01-2010 2:00 AM | A0983D | 458 |
| 123 | 01-01-2010 4:00 AM | A0453A | 325 |
| 123 | 01-01-2010 3:30 PM | A0294C | 458 |
| 123 | 01-01-2010 4:30 PM | A0132B | 325 |
| 123 | 01-01-2010 5:30 PM | A0893B | 458 |
| 123 | 01-01-2010 6:30 PM | A0322D | 687 |
| 456 | 01-01-2010 9:30 PM | A0983D | 687 |
| 456 | 01-01-2010 10:30 PM | A0322D | 458 |

AME IMPRESSION STORE

FIG. 6

| AME USER ID | IMPRESSION TIMESTAMP | CAMPAIGN ID | SITE ID | USER LOGIN TIMESTAMP | PARTNER USER ID |
|---|---|---|---|---|---|
| 123 | 01-01-2010 1:57 AM | A0893B | 325 | 01-01-2010 12:57 AM | TOM |
| 123 | 01-01-2010 2:00 AM | A0983D | 458 | 01-01-2010 12:57 AM | TOM |
| 123 | 01-01-2010 4:00 AM | | 325 | 01-01-2010 12:57 AM | TOM |
| 123 | 01-01-2010 3:30 PM | A0294C | 458 | 01-01-2010 3:00 PM | MARY |
| 123 | 01-01-2010 4:30 PM | A0132B | 325 | 01-01-2010 3:00 PM | MARY |
| 123 | 01-01-2010 5:30 PM | | 458 | 01-01-2010 3:00 PM | MARY |
| 123 | 01-01-2010 6:30 PM | A0322D | 687 | 01-01-2010 6:00 PM | TOM |
| 456 | 01-01-2010 9:30 PM | | 687 | 01-01-2010 8:00 PM | TOM |
| 456 | 01-01-2010 10:30 PM | A0322D | 458 | 01-01-2010 8:00 PM | TOM |

PARTNER-BASED IMPRESSIONS

| FREQUENCY (802) | UUIDs (COOKIES) (804) | IMPRESSION (806) |
|---|---|---|
| 1 | 100,000 | 100,000 |
| 2 | 200,000 | 400,000 |
| 3 | 100,000 | 300,000 |
| 4 | 50,000 | 200,000 |
| 5 | 50,000 | 1,500,000 |
| TOTAL | 500,000 | 2,500,000 |

IMPRESSIONS TOTALIZATION

| AGE/GENDER (902) | IMPRESSIONS (904) | FREQUENCY (906) | IMPRESSION COMP (908) |
|---|---|---|---|
| M 13-18 | 1,000,000 | 4 | 33% |
| F 13-18 | 2,000,000 | 5 | 66% |
| ... | | | |
| F 50+ | 0 | 0 | 0 |
| TOTAL | 3,000,000 | 4.7 | 100% |

CAMPAIGN-LEVEL AGE/GENDER AND
IMPRESSION COMPOSITION TABLE

FIG. 9

METHODS AND APPARATUS TO DETERMINE MEDIA IMPRESSIONS USING DISTRIBUTED DEMOGRAPHIC INFORMATION

RELATED APPLICATION

This patent arises from a continuation of U.S. patent application Ser. No. 18/068,262, filed on Dec. 19, 2022, now U.S. Pat. No. 11,729,287, which is a continuation of U.S. patent application Ser. No. 17/199,139, filed on Mar. 11, 2021, now U.S. Pat. No. 11,533,379, which is a continuation of U.S. patent application Ser. No. 16/792,766, filed on Feb. 17, 2020, now U.S. Pat. No. 10,951,721, which is a continuation of U.S. patent application Ser. No. 16/364,961, filed on Mar. 26, 2019, now U.S. Pat. No. 10,567,531, which is a continuation of U.S. patent application Ser. No. 15/966,195, filed on Apr. 30, 2018, now U.S. Pat. No. 10,284,667, which is a continuation of U.S. patent application Ser. No. 15/409,281, filed on Jan. 18, 2017, now U.S. Pat. No. 9,979,614, which is a divisional of U.S. patent application Ser. No. 13/921,962, filed Jun. 19, 2013, now U.S. Pat. No. 9,596,150, which is a continuation of International Patent Application No. PCT/US11/65881, filed Dec. 19, 2011, which claims priority to U.S. Provisional Patent Application No. 61/424,952, filed on Dec. 20, 2010, all of which are hereby incorporated herein by reference in their entireties.

FIELD OF THE DISCLOSURE

The present disclosure relates generally to monitoring media and, more particularly, to methods and apparatus to determine media impressions using distributed demographic information.

BACKGROUND

Traditionally, audience measurement entities determine audience engagement levels for media programming based on registered panel members. That is, an audience measurement entity enrolls people who consent to being monitored into a panel. The audience measurement entity then monitors those panel members to determine media programs (e.g., television programs or radio programs, movies, DVDs, etc.) exposed to those panel members. In this manner, the audience measurement entity can determine exposure measures for different media content based on the collected media measurement data.

Techniques for monitoring user access to Internet resources such as web pages, advertisements and/or other content has evolved significantly over the years. Some known systems perform such monitoring primarily through server logs. In particular, entities serving content on the Internet can use known techniques to log the number of requests received for their content at their server.

BRIEF DESCRIPTION OF THE DRAWINGS

FIG. 5 is an example partner cookie map that may be used by an Internet service database proprietor to map user identifiers associated with an audience measurement entity with user identifiers of users registered with the Internet service database proprietor.

FIG. 6 is an example impressions table generated by the impression monitor system of the example system of FIG. 1 to correlate impressions with user identifiers of monitored audience members.

FIG. 7 depicts an example partner-based impressions table generated by an Internet service database proprietor to correlate impressions with user identifiers of registered users of the Internet service database proprietors.

FIG. 8 depicts an example impressions table showing quantities of impressions associated with monitored users.

FIG. 9 depicts an example campaign-level age/gender and impression composition table generated by a database proprietor.

DETAILED DESCRIPTION

Figure 1:
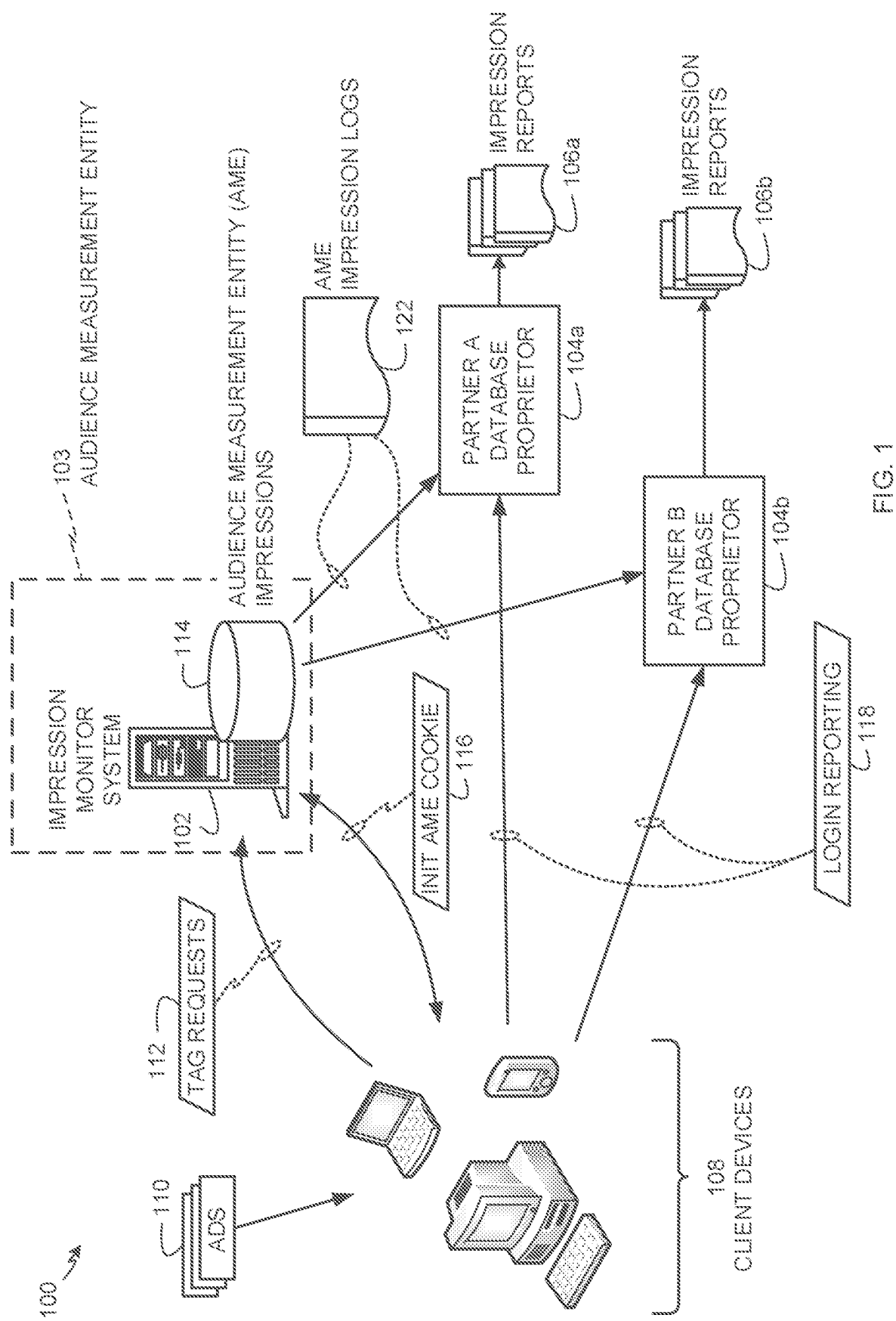
FIG. 1 depicts an example system to determine advertisement and/or content impressions using distributed demographic information.

Techniques for monitoring user access to Internet resources such as web pages, advertisements and/or other content has evolved significantly over the years. At one point in the past, such monitoring was done primarily through server logs. In particular, entities serving content on the Internet would log the number of requests received for their content at their server. Basing Internet usage research on server logs is problematic for several reasons. For example, server logs can be tampered with either directly or via zombie programs that repeatedly request content from the server to increase the server log counts. Secondly, content is sometimes retrieved once, cached locally and then repeatedly viewed from the local cache without involving the server in the repeat viewings. Server logs cannot track these views of cached content. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet content to be tracked is tagged with beacon instructions (e.g., tag instructions). In particular, monitoring instructions are associated with the HTML of the content (e.g., advertisements or other Internet content) to be tracked. When a client requests the content, both the content and the beacon or tag instructions are downloaded to the client either simultaneously (e.g., with the tag instructions present in the HTML) or via subsequent requests (e.g., via execution of a request to retrieve the monitoring instructions embedded in the HTML of the content). The tag instructions are, thus, executed whenever the content is accessed, be it from a server or from a cache.

The tag instructions cause monitoring data reflecting information about the access to the content to be sent from the client that downloaded the content to a monitoring entity. The monitoring entity may be an audience measurement entity that did not provide the content to the client and who is a trusted third party for providing accurate usage statistics (e.g., The Nielsen Company, LLC). Advantageously, because the tag instructions are associated with the content (e.g., embedded in or otherwise linked to some portion of the content) and executed by the client browser whenever the content is accessed, the monitoring information is provided to the audience measurement company irrespective of whether the client is a panelist of the audience measurement company.

In some instances, it is important to link demographics to the monitoring information. To address this issue, the audience measurement company establishes a panel of users who have agreed to provide their demographic information and to have their Internet browsing activities monitored. When an individual joins the panel, they provide detailed information concerning their identity and demographics (e.g., gender, race, income, home location, occupation, etc.) to the audience measurement company. The audience measurement entity sets a cookie (e.g., a panelist cookie) on the panelist computer that enables the audience measurement entity to identify the panelist whenever the panelist accesses tagged content (e.g., content associated with beacon or tag instructions) and, thus, sends monitoring information to the audience measurement entity.

Since most of the clients providing monitoring information from the tagged pages are not panelists and, thus, are unknown to the audience measurement entity, it has heretofore been necessary to use statistical methods to impute demographic information based on the data collected for panelists to the larger population of users providing data for the tagged content. However, panel sizes of audience measurement entities remain small compared to the general population of users. Thus, a problem is presented as to how to increase panel sizes while ensuring the demographics data of the panel is accurate.

There are many database proprietors operating on the Internet. These database proprietors provide services to large numbers of subscribers or registered users. In exchange for the provision of the service, the subscribers register with the proprietor. As part of this registration, the subscribers provide detailed demographic information. Examples of such database proprietors include social network providers such as Facebook, Myspace, etc. These database proprietors set cookies on the computing device (e.g., computer, cell phone, etc.) of their subscribers to enable the database proprietors to recognize the users when they visit their websites.

The protocols of the Internet make cookies inaccessible outside of the domain (e.g., Internet domain, domain name, etc.) on which they were set. Thus, a cookie set in the HFZlaw.com domain is accessible to servers in the HFZlaw.com domain, but not to servers outside that domain. Therefore, although an audience measurement entity might find it advantageous to access the cookies set by the database proprietors, they are unable to do so.

In view of the foregoing, it would be advantageous to leverage the existing databases of database proprietors to collect more extensive Internet usage and demographic data. However, there are several problems in accomplishing this end. For example, a problem is presented as to how to access the data of the database proprietors without compromising the privacy of the subscribers, the panelists, and/or the proprietors of the tracked content. Another problem is how to access this data given the technical restrictions imposed by the Internet protocols that prevent the audience measurement entity from accessing cookies set by the database proprietor. Example methods, apparatus and articles of manufacture disclosed herein solve these problems by extending the beaconing process to encompass partnered database proprietors and by using such partners as sources of distributed demographic information.

Example methods, apparatus, systems, and/or articles of manufacture disclosed herein cooperate with one or more database proprietors (also referred to herein as partners). The database proprietors provide Internet services to their registered users (e.g., users of those database proprietors) and store demographic information (e.g., in user account records) for those registered users. As part of this effort, the database proprietor agrees to provide demographic information of its registered users to the audience measurement entity for purposes of measuring demographic-based exposures to media such as content and/or advertisements. To prevent violating privacy agreements with the registered users of the database proprietor, examples disclosed herein employ cookie mapping techniques. That is, the database proprietor can maintain a mapping of its registered user cookies (i.e., partner cookies assigned by the database proprietor to its registered users) to cookies assigned by the audience measurement entity (i.e., audience measurement entity (AME) cookies) to the same registered users. In this manner, the audience measurement entity can log impressions of registered users based on the AME cookies and send full or partial AME cookie-based impression logs to a database proprietor. The database proprietor can, in turn, match its registered users to the AME cookie-based impressions based on its partner-to-AME cookie map. The database proprietor can then use the matches to associate demographic information for the matching registered users with corresponding impression logs. The database proprietor can then remove any identifying data (i.e., partner cookie data) from the demographic-based impression logs and provide the demographic-based impression logs to the audience measurement entity without revealing the identities of the database proprietor's registered users to the audience measurement entity. Thus, example techniques disclosed herein may be implemented without compromising privacies of registered users of database proprietors that partner with an audience measurement entity to track impressions based on audience demographics.

A database proprietor (e.g., Facebook) can access cookies it has set on a client device (e.g., a computer) to thereby identify the client based on the internal records (e.g., user account records) of the database proprietor. Because the identification of client devices is done with reference to enormous databases of registered users far beyond the quantity of persons present in a typical audience measurement panel, this process may be used to develop data that is extremely accurate, reliable, and detailed.

Because the audience measurement entity remains the first leg of the data collection process (i.e., receives tag requests generated by tag instructions from client devices to log impressions), the audience measurement entity is able to obscure the source of the content access being logged as well as the identity of the content (e.g., advertisements and/or other types of media) itself from the database proprietors (thereby protecting the privacy of the content sources), without compromising the ability of the database proprietors to provide demographic information corresponding to ones of their subscribers for which the audience measurement entity logged impressions.

Example methods, apparatus, and/or articles of manufacture disclosed herein can be used to determine impressions or exposures to advertisements and/or other types of media such as content using demographic information, which is distributed across different databases (e.g., different website owners, different service providers, etc.) on the Internet. Not only do example methods, apparatus, and articles of manufacture disclosed herein enable more accurate correlation of demographics to media impressions, but they also effectively extend panel sizes and compositions beyond persons participating (and/or willing to participate) in the panel of a ratings entity to persons registered in other Internet databases such as the databases of social media sites such as Facebook, Twitter, Google, etc. This extension effectively leverages the content tagging capabilities of the audience ratings entity and the use of databases of non-ratings entities such as social media and other websites to create an enormous, demographically accurate panel that results in accurate, reliable measurements of exposures to Internet content such as advertising and/or programming.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets. Unlike traditional techniques in which audience measurement entities rely solely on their own panel member data to collect demographics-based audience measurements, example methods, apparatus, and/or articles of manufacture disclosed herein enable an audience measurement entity to obtain demographic information from other entities that operate based on user registration models. As used herein, a user registration model is a model in which users subscribe to services of those entities by creating user accounts and providing demographic-related information about themselves. Obtaining such demographic information associated with registered users of database proprietors enables an audience measurement entity to extend or supplement its panel data with substantially reliable demographics information from external sources (e.g., database proprietors), thus extending the coverage, accuracy, and/or completeness of their demographics-based audience measurements. Such access also enables the audience measurement entity to monitor persons who would not otherwise have joined an audience measurement panel.

Any entity having a database identifying demographics of a set of individuals may cooperate with the audience measurement entity. Such entities are referred to herein as "database proprietors" and include entities such as Facebook, Google, Yahoo!, MSN, Twitter, Apple iTunes, Experian, etc. Such database proprietors may be, for example, online web services providers. For example, a database proprietor may be a social network site (e.g., Facebook, Twitter, MySpace, etc.), a multi-service site (e.g., Yahoo!, Google, Experian, etc.), an online retailer site (e.g., Amazon.com, Buy.com, etc.), and/or any other web services site that maintains user registration records and irrespective of whether the site fits into none, one or more of the categories noted above.

Example methods, apparatus, and/or articles of manufacture disclosed herein may be implemented by an audience measurement entity, a ratings entity, or any other entity interested in measuring or tracking audience exposures to advertisements and/or any other media.

To increase the likelihood that measured viewership is accurately attributed to the correct demographics, example methods, apparatus, and/or articles of manufacture disclosed herein use demographic information located in the audience measurement entity's records as well as demographic information located at one or more database proprietors (e.g., web service providers) that maintain records or profiles of users having accounts therewith. In this manner, example methods, apparatus, and/or articles of manufacture may be used to supplement demographic information maintained by a ratings entity (e.g., an audience measurement company such as The Nielsen Company of Schaumburg, Illinois, United States of America, that collects media exposure measurements and/or demographics) with demographic information from one or more different database proprietors (e.g., web service providers).

The use of demographic information from disparate data sources (e.g., high-quality demographic information from the panels of an audience measurement company and/or registered user data of web service providers) results in improving the reporting effectiveness of metrics for online and/or offline advertising campaigns. Examples disclosed herein use online registration data to identify demographics of users. Such examples also use server impression counts, tagging (also referred to as beaconing), and/or other techniques to track quantities of advertisement and/or content impressions attributable to those users. Online web service providers such as social networking sites and multi-service providers (collectively and individually referred to herein as online database proprietors) maintain detailed demographic information (e.g., age, gender, geographic location, race, income level, education level, religion, etc.) collected via user registration processes. An impression corresponds to a home or individual having been exposed to the corresponding media content and/or advertisement. Thus, an impression represents a home or an individual having been exposed to an advertisement or content or group of advertisements or content. In Internet advertising, a quantity of impressions or impression count is the total number of times an advertisement or advertisement campaign has been accessed by a web population (e.g., including number of times accessed as decreased by, for example, pop-up blockers and/or increased by, for example, retrieval from local cache memory).

Example impression reports generated using example methods, apparatus, and/or articles of manufacture disclosed herein may be used to report TV GRPs and online GRPs in a side-by-side manner. For instance, advertisers may use impression reports to report quantities of unique people or users that are reached individually and/or collectively by TV and/or online advertisements.

Although examples are disclosed herein in connection with advertisements, advertisement exposures, and/or advertisement impressions, such examples may additionally or alternatively be implemented in connection with other types of media in addition to or instead of advertisements. That is, processes, apparatus, systems, operations, structures, data, and/or information disclosed herein in connection with advertisements may be similarly used and/or implemented for use with other types of media such as content. "Media" refers to content and/or advertisements. Websites, movies, television and/or other programming is generally referred to herein as content. Advertisements are typically distributed with content. Traditionally, content is provided at little or no cost to the audience because it is subsidized by advertisers who pay to have their advertisements distributed with the content.

Turning now to FIG. 1, an example system 100 is shown. In the illustrated example, the system 100 includes an impression monitor system 102 which may be owned and/or operated by an audience measurement entity 103. In the illustrated examples, the impression monitor system 102 works cooperatively with one or more database proprietors, two of which are shown as a partner A database proprietor 104*a* and a partner B database proprietor 104*b*, to generate impression reports 106*a* and 106*b* using distributed demographic information collected by the database proprietors 104*a* and 104*b*. In the illustrated example, the impression reports 106*a* and 106*b* are indicative of demographic segments, populations, or groups that were exposed to identified advertisements or content. "Distributed demographics information" is used herein to refer to demographics information obtained from a database proprietor such as an online web services provider. In the illustrated example, the impression monitor system 102 may be owned and/or operated by an audience measurement entity to collect and log impressions from client devices 108 using, for example, audience measurement entity (AME) cookies set on those client devices 108. In illustrated examples described herein, AME cookies (e.g., an AME cookie 208 of FIG. 2) are set in the client devices 108 in response to contacting the audience measurement entity 103 after executing monitoring or tag instructions regardless of whether all, some, or none of the client devices 108 are associated with audience member panels of the audience measurement entity 103. That is, by setting AME cookies in the client devices 108, the audience measurement entity 103 is able to log ad and/or content impressions regardless of whether the ad and/or content impressions are attributable to panelists or non-panelists. In the illustrated example of FIG. 1, the client devices 108 may be stationary or portable computers, handheld computing devices, smart phones, Internet appliances, and/or any other type of device that may be connected to the Internet and capable of presenting media content.

In the illustrated example, content providers and/or advertisers distribute advertisements 110 via the Internet to users that access websites and/or online television services (e.g., web-based TV, Internet protocol TV (IPTV), etc.). In the illustrated example, the advertisements 110 may be individual, stand alone ads and/or may be part of one or more ad campaigns. The ads of the illustrated example are encoded with identification codes (i.e., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). The advertisements 110 of the illustrated example are also tagged or encoded to include computer executable monitoring instructions (e.g., Java, java script, or any other computer language or script) that are executed by web browsers that access the advertisements 110 via, for example, the Internet. In the illustrated example of FIG. 1, the advertisements 110 are presented to audience members via the client devices 108. Computer executable monitoring instructions may additionally or alternatively be associated with content to be monitored. Thus, although this disclosure frequently speaks in terms of tracking advertisements, it is not restricted to tracking any particular type of media. On the contrary, it can be used to track media (e.g., content and/or advertisements) of any type or form in a network. Irrespective of the type of media being tracked, execution of the monitoring instructions causes the web browser to send impression requests 112 (e.g., referred to herein as tag requests 112) to a specified server (e.g., the audience measurement entity). The tag requests 112 may be implemented using HTTP requests. However, whereas HTTP requests traditionally identify web pages or other resources to be downloaded, the tag requests 112 of the illustrated example include audience measurement information (e.g., ad campaign identification, content identifier, and/or user identification information) as their payloads. The server (e.g., the impression monitor system 102) to which the tag requests 112 are directed is programmed to log the audience measurement data caused by the tag requests 112 as impressions (e.g., ad and/or content impressions depending on the nature of the media tagged with the monitoring instructions). To collect and log exposure measurements, the impression monitor system 102 includes an AME impressions store 114. Example impression logging processes are described in detail below in connection with FIG. 3.

In some examples, advertisements tagged with such tag instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of content monitoring (e.g., web pages, movies, television programs, etc.) Example techniques that may be used to implement such monitoring, tag and/or beacon instructions are described in Blumenau, U.S. Pat. No. 6,108,637, which is hereby incorporated herein by reference in its entirety.

In the illustrated example of FIG. 1, the impression monitor system 102 tracks users associated with impressions using AME cookies (e.g., name-value pairs of Universally Unique Identifiers (UUIDs)) when the client devices 108 present advertisements (e.g., the advertisements 110) and/or other content. Due to Internet security protocols, the impression monitor system 102 can only collect cookies set in its domain (e.g., AME cookies). Thus, if, for example, the impression monitor system 102 operates in the "Nielsen.com" domain, it can only collect cookies set in the Nielsen.com domain. Thus, when the impression monitor system 102 receives tag requests 112 from the client devices 108, the impression monitor system 102 only has access to AME cookies set on that client device for, for example, the Nielsen.com domain, but not cookies set outside its domain (e.g., outside the Nielsen.com domain).

To overcome the domain limitations associated with collecting cookie information, the impression monitoring system 102 monitors impressions of users of the client devices 108 that are registered users of one or both of the partner A and partner B database proprietors 104*a* and 104*b*. When a user of one of the client devices 108 logs into a service of one of the database proprietors 104*a* or 104*b*, the client device 108 performs an initialization (INIT) AME cookie message exchange 116 with the impression monitor system 102 and sends a login reporting message 118 to the database proprietor providing that service. For example, as described in more detail below in connection with FIG. 2, if a user logs into a service of the partner A database proprietor 104a, the INIT AME cookie message exchange 116 sets an AME cookie in the client device 108 based on the domain of the impression monitor system 102 for the user that logged into the service of the partner A database proprietor 104a. In addition, the login reporting message 118 sent to the partner A database proprietor 104a includes the same AME cookie for the client device 108 and a partner A cookie set by the partner A database proprietor 104a for the same client device 108. In the illustrated example, the partner A database proprietor 104a sets the partner A cookie in the client device 108 when the client device 108 visits a webpage of the partner A database proprietor 104a and/or when a user logs into a service of the partner A database proprietor 104a via a login page of the partner A database proprietor 104a (e.g., the login webpage 204 of FIG. 2). In the illustrated example, the AME cookie is outside a domain (e.g., a root domain) of the partner A cookie. The login reporting message 118 enables the partner A database proprietor 104a to map its partner A cookie to the AME cookie for the user of the client device 108. The INIT AME cookie message exchange 116 includes a login timestamp indicative of when a user associated with the specified AME cookie logged into the partner A database proprietor 104a. If an AME cookie was previously set for the client, a new AME cookie is not set unless the previous AME cookie has been removed from the client, is not longer present on the client, and/or has expired. These processes are described in greater detail below in connection with FIG. 2.

Subsequently, the impression monitor system 102 receives the tag requests 112 based on ads and/or content presented via the client devices 108 and logs impressions based on the presented ads and/or content in association with respective AME cookies of the client devices 108 as described in detail below in connection with FIG. 3. In the illustrated example of FIG. 1, the impression monitor system 102 stores the logged impressions in the AME impressions store 114 and subsequently sends AME impression logs 122 containing some or all of the logged impressions from the AME impressions store 114 to the partner database proprietors 104a and 104b.

Each of the partner database proprietors 104a-b may subsequently use their respective AME cookie-to-partner cookie mappings to match demographics of users of the client devices 108 identified based on partner cookies with impressions logged based on AME cookies in the AME impression logs 122. Example demographic matching and reporting is described in greater detail below in connection with FIG. 4. Because the audience measurement entity 103 sets AME cookies on any client that sends it a tag request (i.e., including non-panelists), the map of the AME cookies to partner cookies is not limited to panelists but instead extends to any client that accesses tagged media. As a result, the audience measurement entity 103 is able to leverage the data of the partner as if the non-panelists with AME cookies were panelists of the audience measurement entity 103, thereby effectively increasing the panel size. In some examples, the panel of the audience measurement entity is eliminated.

Figure 2:
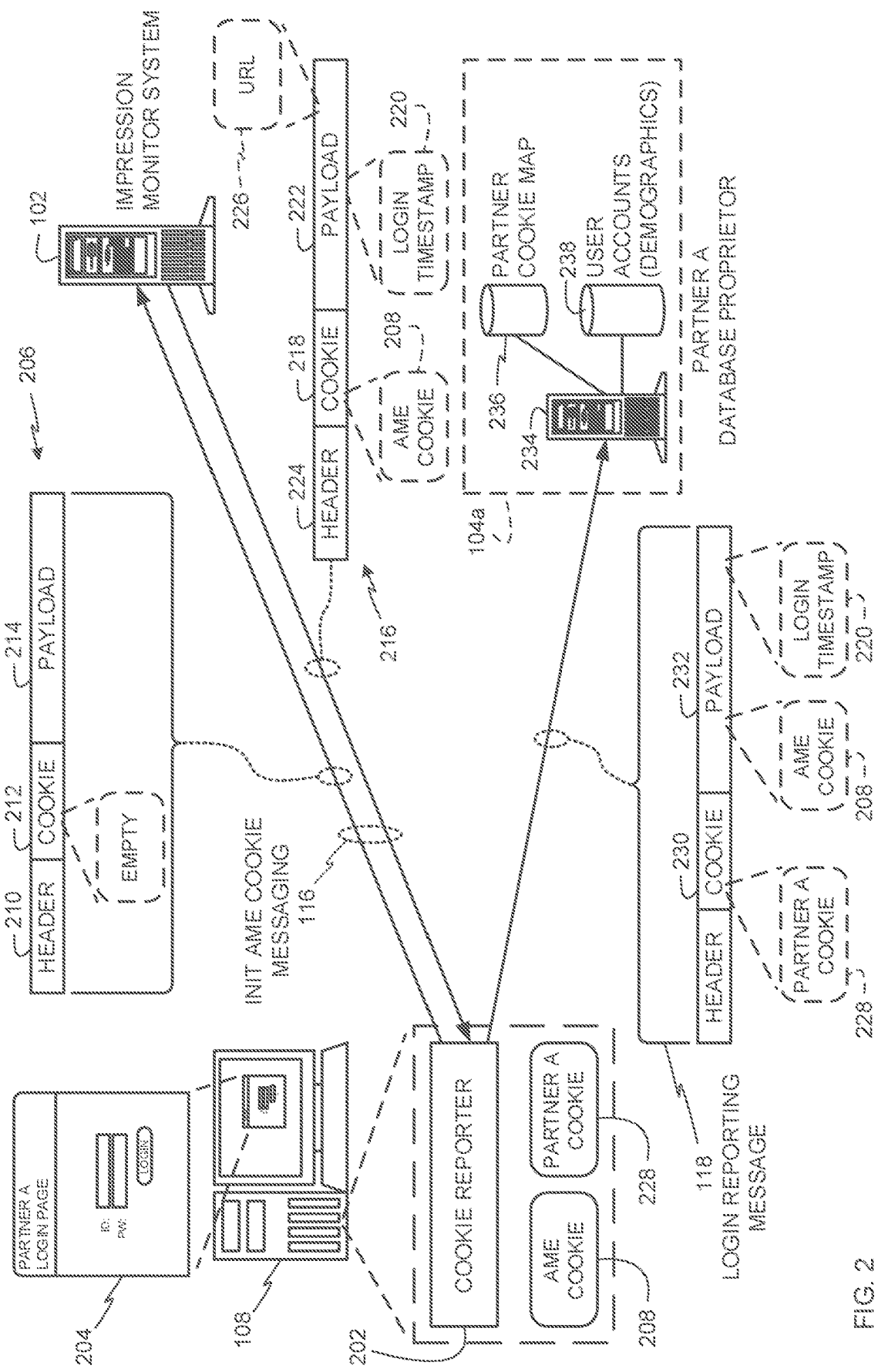
FIG. 2 depicts an example manner of reporting cookies to an audience measurement entity and database proprietor(s) in response to users logging in to website(s) of the database proprietor(s).

FIG. 2 depicts an example manner of setting cookies with the impression monitor system 102 and reporting the same to the database proprietors (e.g., the partner A database proprietor 104a and/or the partner B database proprietor 104b) in response to users logging in to websites of the database proprietors. One of the client devices 108 of FIG. 1 is shown in FIG. 2 and is provided with a cookie reporter 202 configured to monitor login events on the client device 108 and to send cookies to the impression monitor system 102 and the database proprietors 104a and 104b. In the illustrated example of FIG. 2, the cookie reporter 202 is shown performing the INIT AME cookie message exchange 116 with the impression monitor system 102 and sending the login reporting message 118 to the partner A database proprietor 104a.

In the illustrated example of FIG. 2, the cookie reporter 202 is implemented using computer executable instructions (e.g., Java, java script, or any other computer language or script) that are executed by web browsers. Also in the illustrated example of FIG. 2, the cookie reporter 202 is provided to the clients, directly or indirectly, by an audience measurement entity that owns and/or operates the impression monitor system 102. For example, the cookie reporter 202 may be provided to the database proprietor from the AME 103 and subsequently downloaded to the client device 108 from a server serving a login webpage 204 of the partner A database proprietor 104a (or of the partner B database proprietor 104b or of any other partner database proprietor) in response to the client device 108 requesting the login webpage.

A web browser of the client device 108 may execute the cookie reporter 202 to monitor for login events associated with the login page 204. When a user logs in to a service of the partner A database proprietor 104a via the login page 204, the cookie reporter 202 initiates the INIT AME message exchange 116 by sending a request 206 to the impression monitor system 102. In the illustrated example of FIG. 2, the request 206 is a dummy request because its purpose is not to actually retrieve a webpage, but is instead to cause the impression monitor system 102 to generate an AME cookie 208 for the client device 108 (assuming an AME cookie has not already been set for and/or is not present on the client). The AME cookie 208 uniquely identifies the client device 108. However, because the client device 108 may not be associated with a panelist of the AME 103, the identity and/or characteristics of the user may not be known. The impression monitor system 102 subsequently uses the AME cookie 208 to track or log impressions associated with the client device 108, irrespective of whether the client device 108 is a panelist of the AME 103, as described below in connection with FIG. 3. Because disclosed examples monitor clients as panelists even though they may not have been registered (i.e., have not agreed to be a panelist of the AME 103), such clients may be referred to herein as pseudo-panelists.

The request 206 of the illustrated example is implemented using an HTTP request that includes a header field 210, a cookie field 212, and a payload field 214. The header field 210 stores standard protocol information associated with HTTP requests. When the client device 108 does not yet have an AME cookie set therein, the cookie field 212 is empty to indicate to the impression monitor system 102 that it needs to create and set the AME cookie 208 in the client device 108. In response to receiving a request 206 that does not contain an AME cookie 208, the impression monitor system 102 generates an AME cookie 208 and sends the AME cookie 208 to the client device 108 in a cookie field 218 of a response message 216 as part of the INIT AME cookie message exchange 116 of FIG. 1 to thereby set the AME cookie 208 in the client device 108.

In the illustrated example of FIG. 2, the impression monitor system 102 also generates a login timestamp 220 indicative of a time at which a user logged in to the login page 204 and sends the login timestamp 220 to the client device 208 in a payload field 222 of the response 216. In the illustrated example, the login timestamp 220 is generated by the impression monitor system 102 (e.g., rather than the client device 108) so that all login events from all client devices 108 are time stamped based on the same clock (e.g., a clock of the impression monitor system 102). In this manner, login times are not skewed or offset based on clocks of respective client devices 108, which may have differences in time between one another. In some examples, the timestamp 220 may be omitted from the payload 222 of the response 216, and the impression monitor system 102 may instead indicate a login time based on a timestamp in a header field 224 of the response 216. In some examples, the response 216 is an HTTP 302 redirect response which includes a URL 226 of the partner A database proprietor 104a to which the cookie reporter 202 should send the AME cookie 208. The impression monitor system 102 populates the redirect response with the URL.

In the illustrated example of FIG. 2, after receiving the response 216, the cookie reporter 202 generates and sends the login reporting message 118 to the partner A database proprietor 104a. For example, the cookie reporter 202 of the illustrated example sends the login reporting message 118 to a URL indicated by the login page 204. Alternatively, if the response 216 is an HTTP 302 redirect and includes the URL 226, the cookie reporter 202 sends the login reporting message 118 to the partner A database proprietor 104a using the URL 226. In the illustrated example of FIG. 2, the login reporting message 118 includes a partner A cookie 228 in a cookie field 230. The partner A cookie 228 uniquely identifies the client device 108 for the partner A database proprietor 104a. Also in the illustrated example, the cookie reporter 202 sends the AME cookie 208 and the login timestamp 220 in a payload field 232 of the login reporting message 118. Thus, in the illustrated example of FIG. 2, the AME cookie 208 is sent as regular data (e.g., a data parameter) or payload in the login reporting message 118 to the partner A database proprietor 104a to overcome the fact that the AME cookie 208 was not set in the domain of the partner A database proprietor 104a. In the illustrated example, the AME cookie 208 corresponds to another domain (e.g., a Nielsen.com root domain) outside the domain of the partner A cookie 228 (e.g., a Facebook.com root domain). Using example processes illustrated in FIG. 2 advantageously enables sending cookie data across different domains, which would otherwise not be possible using known cookie communication techniques. The database proprietor 104a receives the AME cookie 208 in association with the partner A cookie 228, thereby, creating an entry in an AME cookie-to-partner cookie map (e.g., the partner cookie map 236).

Although the login reporting message 118 is shown in the example of FIG. 2 as including the partner A cookie 228, for instances in which the partner A database proprietor 104a has not yet set the partner A cookie 228 in the client device 108, the cookie field 230 is empty in the login reporting message 118. In this manner, the empty cookie field 230 prompts the partner A database proprietor 104a to set the partner A cookie 228 in the client device 108. In such instances, the partner A database proprietor 104a sends the client device 108 a response message (not shown) including the partner A cookie 228 and records the partner A cookie 228 in association with the AME cookie 208.

In some examples, the partner A database proprietor 104a uses the partner A cookie 228 to track online activity of its registered users. For example, the partner A database proprietor 104a may track user visits to web pages hosted by the partner A database proprietor 104a, display those web pages according to the preferences of the users, etc. The partner A cookie 228 may also be used to collect "domain-specific" user activity. As used herein, "domain-specific" user activity is user Internet activity associated within the domain(s) of a single entity. Domain-specific user activity may also be referred to as "intra-domain activity." In some examples, the partner A database proprietor 104a collects intra-domain activity such as the number of web pages (e.g., web pages of the social network domain such as other social network member pages or other intra-domain pages) visited by each registered user and/or the types of devices such as mobile devices (e.g., smart phones) or stationary devices (e.g., desktop computers) used for access. The partner A database proprietor 104a may also track account characteristics such as the quantity of social connections (e.g., friends) maintained by each registered user, the quantity of pictures posted by each registered user, the quantity of messages sent or received by each registered user, and/or any other characteristic of user accounts.

In some examples, the cookie reporter 202 is configured to send the request 206 to the impression monitor system 102 and send the login reporting message 118 to the partner A database proprietor 104a only after the partner A database proprietor 104a has indicated that a user login via the login page 204 was successful. In this manner, the request 206 and the login reporting message 118 are not performed unnecessarily should a login be unsuccessful. In the illustrated example of FIG. 2, a successful login ensures that the partner A database proprietor 104a will associate the correct demographics of a logged in registered user with the partner A cookie 228 and the AME cookie 208.

In the illustrated example of FIG. 2, the partner A database proprietor 104a includes a server 234, a partner cookie map 236, and a user accounts database 238. Although not shown, other database proprietors (e.g., the partner B database proprietor 104b of FIG. 1) that partner with the audience measurement entity 103 (FIG. 1) also include a respective partner cookie map similar to the partner cookie map 236 and a user accounts database similar to the user accounts database 238 but, of course, relative to their own users. The server 234 of the illustrated example communicates with the client device 108 to, for example, receive login information, receive cookies from the client device 108, set cookies in the client device 108, etc.

The partner cookie map 236 stores partner cookies (e.g., the partner A cookie 228) in association with respective AME cookies (e.g., the AME cookie 208) and respective timestamps (e.g., the timestamp 220). In the illustrated example of FIG. 2, the partner cookie map 236 stores a unique user ID (UUID) found in a name-value pair (i.e., a parameter name such as 'user ID' and a value such as the UUID) of the partner A cookie 228 in association with a unique user ID found in a name-value pair of the AME cookie 208. In addition, the partner cookie map 236 stores the login timestamp 220 in association with the UUIDs to indicate a time at which a corresponding user login occurred. Referring briefly to FIG. 5, an example implementation of the partner cookie map 236 is shown, in which an AME user ID column 502 stores UUIDs from AME cookies (e.g., the AME cookie 208 of FIG. 2), a partner user ID column 504 stores UUIDs from partner cookies (e.g., the partner A cookie 228 of FIG. 2), and a login timestamp column 506 stores login timestamps (e.g., the login timestamp 220 of FIG. 2). In illustrated examples disclosed herein, the partner A database proprietor 104a uses the partner cookie map 236 to match impressions received from the impression monitor system 102 based on AME cookies (e.g., the AME cookie 208) to registered users of the partner A database proprietor 104a identified by respective partner A cookies (e.g., the partner A cookie 228). In this manner, the partner A database proprietor 104a can determine which of its registered users are associated with specific impressions logged by the impression monitor system 102.

Returning to FIG. 2, the partner A database proprietor 104a uses the user accounts database 238 to store, among other things, demographic information for registered users of the partner A database proprietor 104a. In the illustrated example of FIG. 2, such demographic information is received from registered users during an enrollment and/or registration process or during a subsequent personal information update process. The demographic information stored in the user accounts database 238 may include, for example, age, gender, interests (e.g., music interests, movie interests, product interests, or interests associated with any other topic), number of friends or social connections maintained by each registered user via the partner A database proprietor 104a, personal yearly income, household income, geographic location of residence, geographic location of work, graduation year(s), quantity of group associations, or any other demographic information. The partner A database proprietor 104a uses the user accounts database 238 to associate demographic information to particular impressions logged by the impression monitor system 102 after determining which registered users of the partner A database proprietor 104a correspond to which logged impressions based on the partner cookie map 236.

Figure 3:
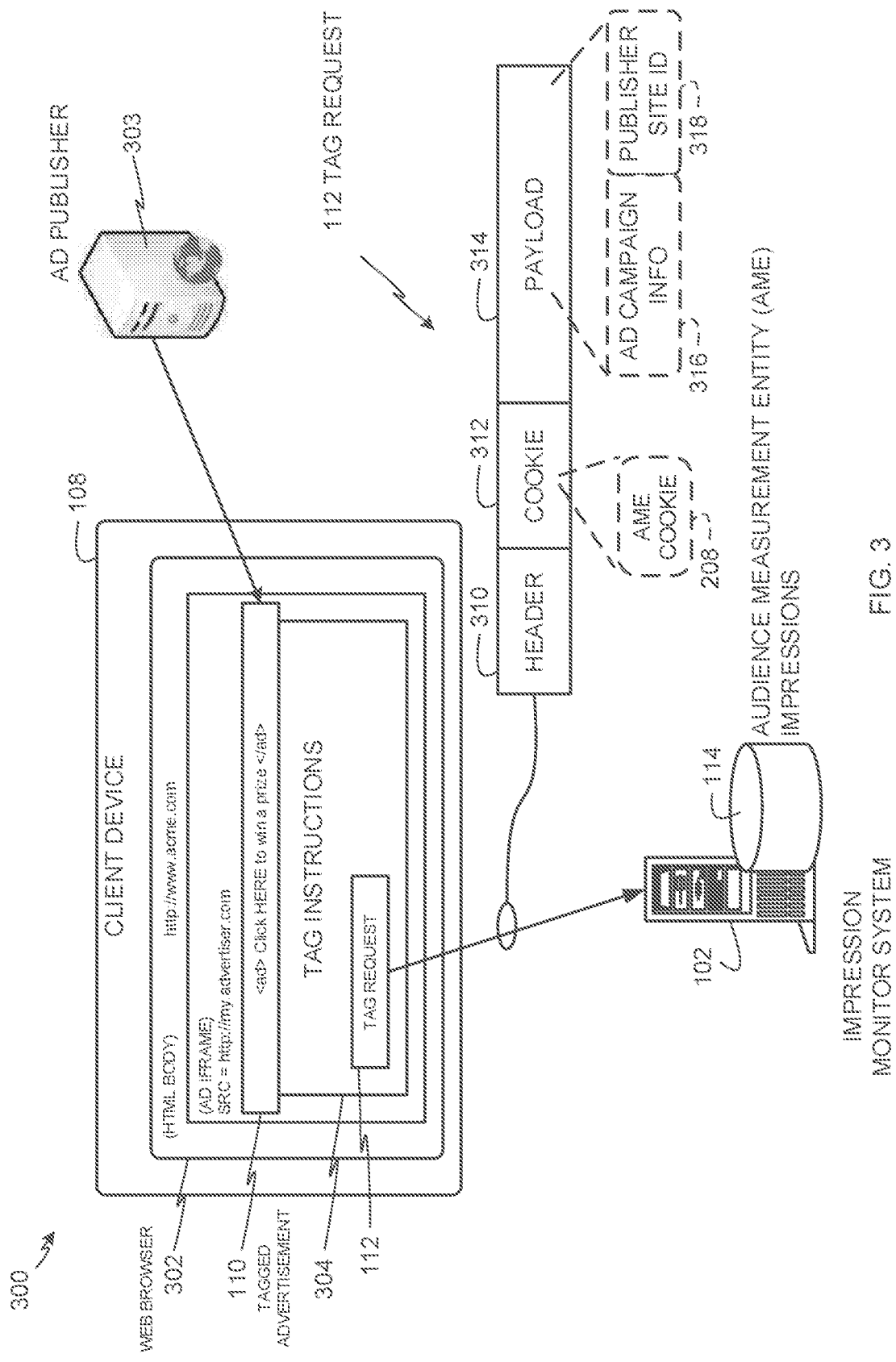
FIG. 3 depicts an example manner in which a web browser can report impressions to an impression monitor of the example system of FIG. 1.

FIG. 3 depicts an example system 300 that may be used to log impressions at the impression monitor system 102 of the example system 100 of FIG. 1. The example system 300 enables the impressions monitor system 102 of FIGS. 1 and 2 to log impressions in association with corresponding AME cookies (e.g., the AME cookie 208 of FIG. 2) based on tag requests (e.g., the tag requests 112 of FIG. 1) received from a web browser 302 executed by a client device (e.g., any client device 108 of FIGS. 1 and 2). In the illustrated example of FIG. 3, the impression monitor system 102 logs impressions from any client device (e.g., the client devices 108 of FIG. 1) from which it receives a tag request 112 as described below. The impression monitor system 102 compiles the received impression data in the AME impression data store 114.

Turning in detail to FIG. 3, the client device may be any one of the client devices 108 of FIGS. 1 and 2 or another device not shown in FIG. 1 or 2. However, for simplicity of discussion and without loss of generality, the client device will be referred to as client device 108. As shown, the client device 108 sends communications to the impressions monitor system 102. In the illustrated example, the client device 108 executes the web browser 302, which is directed to a host website (e.g., www.acme.com) that displays one of the advertisement(s) 110 received from an ad publisher 303. The advertisement 110 of the illustrated example is tagged with identifier information (e.g., a campaign ID, a creative type ID, a placement ID, a publisher source URL, etc.) and tag instructions 304. When the tag instructions 304 are executed by the client device 108, the tag instructions 304 cause the client device 108 to send a tag request 112 to a URL address of the impressions monitor system 102 as specified in the tag instructions 304. Alternatively, the URL address specified in the tag instructions 304 may direct the tag request 112 to any other server owned, operated, and/or accessible by the audience measurement entity 103 (FIG. 1) or another entity. The tag instructions 304 may be implemented using java script or any other type(s) of executable instruction(s) including, for example, Java, HTML, etc. It should be noted that tagged content such as web pages, and/or any other media are processed the same way as the tagged advertisement 110. That is, for any tagged media, corresponding tag instructions are received in connection with the download of the tagged content and cause a tag request to be sent from the client device that downloaded the tagged content to the impression monitor system 102 (or any other server indicated by the instructions).

In the illustrated example of FIG. 3, the tag request 112 is implemented using an HTTP request and is shown in detail as including a header field 310, a cookie field 312, and a payload field 314. In the illustrated example of FIG. 3, the web browser 302 stores the AME cookie 208 of FIG. 2 in the cookie field 312 and stores ad campaign information 316 and a publisher site ID 318 in the payload field 314. In the illustrated example, the ad campaign information 316 may include information identifying one or more of an associated ad campaign (e.g., an ad campaign ID), a creative type ID (e.g., identifying a Flash-based ad, a banner ad, a rich type ad, etc.), and/or a placement ID (e.g., identifying the physical placement of the ad on a screen). In some examples, to log a content impression, the ad campaign information 316 is replaced with content information identifying the content (e.g., a content identifier), a creative ID, and/or a placement ID. In the illustrated example, the publisher site ID 318 identifies a source of the advertisement 110 and/or content (e.g., a source ID identifying the ad publisher 303 and/or content publisher).

In the illustrated example, in response to receiving the tag request 112, the impression monitor system 102 logs an impression associated with the client device 108 in the AME impressions store 114 by storing the AME cookie 208 in association with a content identifier (e.g., the ad campaign information 316 and/or the publisher site ID 318). In addition, the impression monitor system 102 generates a timestamp indicative of the time/date of when the impression occurred and stores the timestamp in association with the logged impression. An example implementation of the example AME impression store 114 is shown in FIG. 6. Turning briefly to FIG. 6, the AME impression store 114 includes an AME user ID column 602 to store AME cookies (e.g., the AME cookie 208 of FIGS. 2 and 3), a timestamp column 604 to store impression timestamps indicative of when impressions occurred at client devices (e.g., the client device 108 of FIGS. 1-3), a campaign ID column 606 to store the campaign information 316 of FIG. 3, and a site ID column 608 to store the publisher site ID 318 of FIG. 3.

Figure 4:
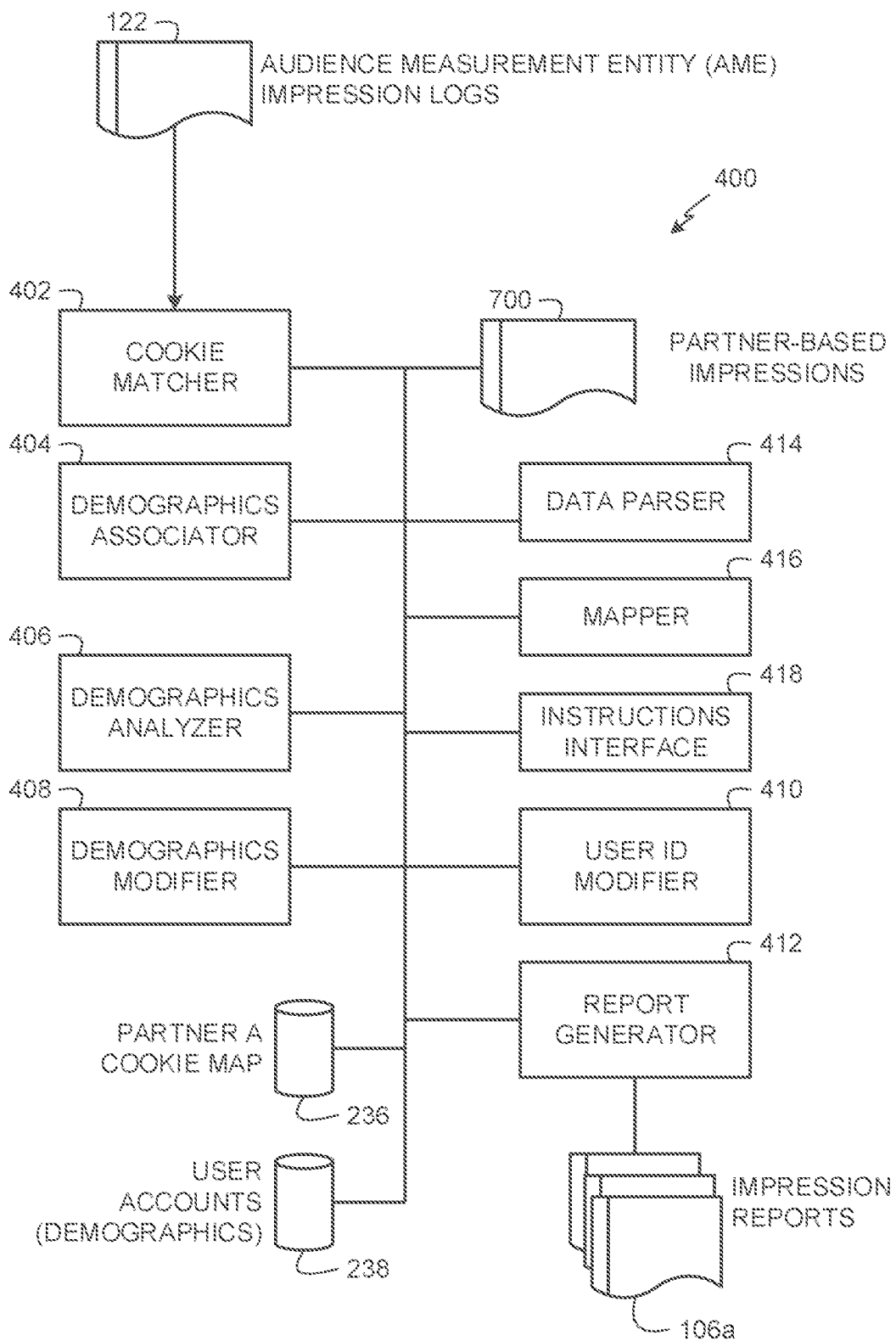
FIG. 4 is an example apparatus that may be used to associate impressions with demographics of users registered with one or more database proprietors.

FIG. 4 is an example apparatus 400 that may be used to associate impressions with demographics of users (e.g., users of the client devices 108 of FIGS. 1-3) registered with one or more database proprietors (e.g., the partner database proprietors 104a-b of FIGS. 1-3). In some examples, the apparatus 400 is implemented at one or more database proprietors (e.g., the partner database proprietors 104a-b of FIGS. 1-3). Alternatively, the apparatus 400 may be implemented at other sites. In some examples, the apparatus 400 may be developed by the audience measurement entity 103 (FIG. 1) and provided to a database proprietor to enable the database proprietor to combine database proprietor-owned demographic information with impression logs provided by the audience measurement entity 103. To ensure privacy of registered users of a database proprietor, the audience measurement entity 103 may install or locate the example apparatus 400 at a database proprietor so that the database proprietor need not provide identities of its registered users to the audience measurement entity 103 in order to associate demographics information with logged impressions. Instead, the audience measurement entity 103 can provide its logged impressions (e.g., the AME impression logs 122) to the database proprietor and the database proprietor can associate respective demographics with the logged impressions while concealing the identities (e.g., names and content information) of its registered users.

In the illustrated example, the apparatus 400 is provided with an example cookie matcher 402, an example demographics associator 404, an example demographics analyzer 406, an example demographics modifier 408, an example user ID modifier 410, an example report generator 412, an example data parser 414, an example mapper 416, and an example instructions interface 418. While an example manner of implementing the apparatus 400 has been illustrated in FIG. 4, one or more of the elements, processes and/or devices illustrated in FIG. 4 may be combined, divided, re-arranged, omitted, eliminated and/or implemented in any other way. Further, the cookie matcher 402, the demographics associator 404, the demographics analyzer 406, the demographics modifier 408, the user ID modifier 410, the report generator 412, the data parser 414, the mapper 416, the instructions interface 418 and/or, more generally, the example apparatus 400 of FIG. 4 may be implemented by hardware, software, firmware and/or any combination of hardware, software and/or firmware. Thus, for example, any of the cookie matcher 402, the demographics associator 404, the demographics analyzer 406, the demographics modifier 408, the user ID modifier 410, the report generator 412, the data parser 414, the mapper 416, the instructions interface 418 and/or, more generally, the example apparatus 400 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the cookie matcher 402, the demographics associator 404, the demographics analyzer 406, the demographics modifier 408, the user ID modifier 410, the report generator 412, the data parser 414, the mapper 416, and/or the instructions interface 418 are hereby expressly defined to include a tangible computer readable medium such as a memory, DVD, CD, BluRay disk, etc. storing the software and/or firmware. Further still, the example apparatus 400 of FIG. 4 may include one or more elements, processes and/or devices in addition to, or instead of, those illustrated in FIG. 4, and/or may include more than one of any or all of the illustrated elements, processes and devices.

Turning in detail to FIG. 4, in the illustrated example, the apparatus 400 is implemented at the partner A database proprietor 104a (FIGS. 1 and 2). Other instances of the apparatus 400 could be similarly implemented at any other database proprietor participating with the AME 103 (e.g., the partner B database proprietor 104b). In the illustrated example of FIG. 4, the apparatus 400 receives the AME impression logs 122 from the impression monitor system 102 to enable the apparatus 400 to associate user/audience member demographics from the user accounts database 238 with logged impressions.

In the illustrated example, the apparatus 400 is provided with the cookie matcher 402 to match AME user IDs from AME cookies (e.g., the AME cookie 208 of FIGS. 2 and 3) from the AME impression logs 122 to AME user IDs in the partner A cookie map 236. The apparatus 400 performs such cookie matching to identify registered users of the partner A database proprietor 104a to which the logged impressions are attributable (e.g., partner A registered users for which the impression monitor system 102 set AME cookies as described above in connection with FIG. 2 and tracked impressions as described above in connection with FIG. 3). For example, the partner cookie map 236 is shown in FIG. 5 as associating AME user IDs in the AME user ID column 502 to partner user IDs in the partner user ID column 504. The AME impression logs 122 are structured similar to the data in the AME impression store 114 as shown in FIG. 6, which logs impressions per AME user ID. Thus, the cookie matcher 402 matches AME user IDs from the AME user ID column 602 of the AME impression logs 122 to AME user IDs of the AME user ID column 502 of the partner cookie map 236 to associate a logged impression from the AME impression logs 122 to a corresponding partner user ID mapped in the partner cookie map 236 of FIG. 5. In some examples, the AME 103 encrypts, obfuscates, varies, etc. campaign IDs in the AME impression logs 122 before sending the AME impression logs 122 to partner database proprietors (e.g., the partner database proprietors 104a and 104b of FIGS. 1 and 2) to prevent the partner database proprietors from recognizing the content to which the campaign IDs correspond or to otherwise protect the identity of the content. In such examples, a lookup table of campaign ID information may be stored at the impression monitor system 102 so that impression reports (e.g., the impression reports 106a and 106b of FIG. 1) received from the partner database proprietors can be correlated with the content.

In some examples, the cookie matcher 402 uses login timestamps (e.g., the login timestamp 220 of FIG. 2) stored in the login timestamp column 506 of FIG. 5 and impression timestamps stored in the timestamp column 604 of FIG. 6 to discern between different users to which impressions logged by the impression monitor system 102 are attributable. That is, if two users having respective username/password login credentials for the partner A database proprietor 104a use the same client device 108, all impressions logged by the impression monitor system 102 will be based on the same AME cookie (e.g., the AME cookie 208 of FIGS. 2 and 3) set in the client device 108 regardless of which user was using the client device 108 when the impression occurred. However, by comparing logged impression timestamps (e.g., in the timestamp column 604 of FIG. 6) to login timestamps (e.g., in the login timestamp column 506 of FIG. 5), the cookie matcher 402 can determine which user was logged into the partner A database proprietor 104a when a corresponding impression occurred. For example, if a user 'TOM' logged in to the partner A database proprietor 104a at 12:57 AM on Jan. 1, 2010 and a user 'MARY' logged in to the partner A database proprietor 104a at 3:00 PM on Jan. 1, 2010 using the same client device 108, the login events are associated with the same AME cookie (e.g., the AME cookie 208 of FIGS. 2 and 3). In such an example, the cookie matcher 402 associates any impressions logged by the impression monitor system 102 for the same AME cookie between 12:57 AM and 3:00 pm on Jan. 1, 2010 to the user 'TOM' and associates any impressions logged by the impression monitor system 102 for the same AME cookie after 3:00 pm on Jan. 1, 2010 to the user 'MARY'. Such time-based associations are shown in the illustrated example data structure of FIG. 7 described below.

In the illustrated example, the cookie matcher 402 compiles the matched results into an example partner-based impressions data structure 700, which is shown in detail in FIG. 7. Turning briefly to FIG. 7, the partner-based impressions structure 700 includes an AME user ID column 702, an impression timestamp column 704, a campaign ID column 706, a site ID column 708, a user login timestamp 710, and a partner user ID column 712. In the AME user ID column 702, the cookie matcher 402 stores AME cookies (e.g., the AME cookie 208 of FIGS. 2 and 3). In the impression timestamp column 704, the cookie matcher 402 stores timestamps generated by the impression monitor system 102 indicative of when each impression was logged. In the campaign ID column 706, the cookie matcher 402 stores ad campaign IDs stored in, for example, the campaign information 316 of FIG. 3. In some examples, instead of or in addition to the campaign ID column 706, the partner-based impressions data structure 700 includes a content ID column to store identifying information of content. In some examples, some content (e.g., advertisements and/or other media) is not associated with a campaign ID or content ID. In the illustrated example of FIG. 7, blanks in the campaign ID column 706 indicate content that is not associated with campaign IDs and/or content IDs. In the site ID column 708, the cookie matcher 402 stores advertisement publisher site IDs (e.g., the publisher site ID 318 of FIG. 3). In the user login timestamp column 710, the cookie matcher 402 stores timestamps (e.g., the timestamp 220 of FIG. 2) indicative of when respective users logged in via partner login pages (e.g., the login page 204 of FIG. 2). In the partner user ID column 712, the cookie matcher 402 stores partner cookies (e.g., the partner A cookie 228 of FIG. 2).

Returning to FIG. 4, in the illustrated example, the apparatus 400 is provided with the demographics associator 404 to associate demographics information from the user accounts database 238 with corresponding partner-based impressions from the partner-based impressions structure 700. For example, the demographics associator 404 may retrieve demographics information for partner user IDs noted in the partner user ID column 712 (FIG. 7) and associate the retrieved demographics information with corresponding ones of the records in the partner-based impressions structure 700.

In the illustrated example of FIG. 4, to analyze demographic information for accuracy and/or completeness, the apparatus 400 is provided with the demographics analyzer 406. In addition, to update, modify, and/or fill-in demographics information in inaccurate and/or incomplete records, the apparatus 400 is provided with the demographics modifier 408. In some examples, the demographics analyzer 406 and/or the demographics modifier 408 analyze and/or adjust inaccurate demographic information using example methods, systems, apparatus, and/or articles of manufacture disclosed in U.S. patent application Ser. No. 13/209,292, filed on Aug. 12, 2011, and titled "Methods and Apparatus to Analyze and Adjust Demographic Information," which is hereby incorporated herein by reference in its entirety.

In the illustrated example, to remove user IDs from the partner-based impressions structure 700 after adding the demographics information and before providing the data to the AME 103, the apparatus 400 of the illustrated example is provided with a user ID modifier 410. In the illustrated example, the user ID modifier 410 is configured to at least remove partner user IDs (from the partner user ID column 712) to protect the privacy of registered users of the partner A database proprietor 104a. In some examples, the user ID modifier 410 may also remove the AME user IDs (e.g., from the AME user ID column 702) so that the impression reports 106a generated by the apparatus 400 are demographic-level impression reports. "Removal" of user IDs (e.g., by the user ID modifier 410 and/or by the report generator 412) may be done by not providing a copy of the data in the corresponding user ID fields as opposed to deleting any data from those fields. If the AME user IDs are preserved in the impressions data structure 700, the apparatus 400 of the illustrated example can generate user-level impression reports.

In the illustrated example of FIG. 4, to generate the impression reports 106a, the apparatus 400 is provided with the report generator 412. Example information that the report generator 412 may generate for the impression reports 106a is described in detail below in connection with FIGS. 8 and 9.

In the illustrated example of FIG. 4, to parse information, the apparatus 400 is provided with the data parser 414. In some examples, the data parser 414 receives messages from client devices and/or other systems and parses information from those received messages. For example, the apparatus 400 may use the data parser 414 to receive the login reporting message 118 from the cookie reporter 202 (FIG. 2) and parse out the partner A cookie 228, the AME cookie 208, and/or the login timestamp 220 from the login reporting message 118. In some examples, the apparatus 400 also uses the data parser 414 to parse information in the AME impression logs 122 and/or to parse information from any other data structure and/or message.

In the illustrated example of FIG. 4, to map information, the apparatus 400 is provided with the mapper 416. In some examples, the mapper 416 maps cookie identifiers associated with the same user but corresponding to different Internet domains. For example, the apparatus 400 may use the mapper 416 to map the partner A cookie 228 to the AME cookie 208 (FIG. 2) in the partner cookie map 236 (FIGS. 2, 4, and 5). In some examples, the mapper 416 also maps login timestamps with corresponding cookie identifiers. For example, the apparatus 400 may use the mapper 416 to map the login timestamp 220 (FIG. 2) with the corresponding partner A cookie 228 and AME cookie 208 in the partner cookie map 236.

In the illustrated example of FIG. 4, to send computer executable instructions to the client device(s) 108 to monitor user logins via login webpages (e.g., the login webpage 204 of FIG. 2), the apparatus 400 is provided with the instructions interface 418. For example, the apparatus 400 may use the instructions interface 418 to send computer executable instructions (e.g., Java, java script, or any other computer language or script) to the client device 108 that are executed by the web browser 302 (FIG. 3) to implement the cookie reporter 202 (FIG. 2). In some examples, the instructions interface 418 sends the computer executable instructions to the client device 108 in response to receiving a request from the web browser 302 for a login webpage (e.g., the login webpage 204) of an Internet-based service provided by the entity (e.g., one of the database proprietor partners 104a and 104b) that implements the apparatus 400. In this manner, the client device 108 can execute the computer executable instructions to monitor login events at the login webpage.

Figure 15:
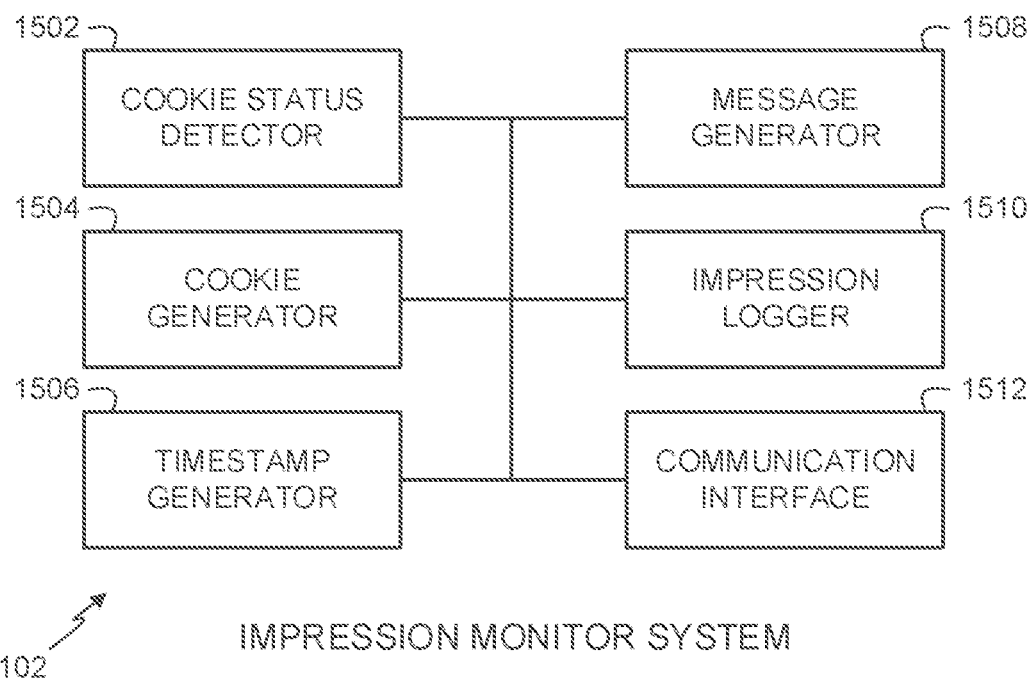
FIG. 15 is an example apparatus that may be used to implement the impression monitor of FIGS. 1-3.

FIG. 15 is an example apparatus that may be used to implement the impression monitor system 102 of FIGS. 1-3. In the illustrated example, to detect whether AME cookies (e.g., the AME cookie 208 of FIG. 2) have been set (e.g., are stored) in client devices (e.g., any of the client devices 108 of FIGS. 1-3), the impression monitor system 102 is provided with a cookie status detector 1502. For example, the cookie status detector 1502 may inspect or analyze messages (e.g., the request 206 of FIG. 2) from client devices to determine whether AME cookies are present therein. In the illustrated example, to generate AME cookies (e.g., the AME cookie 208 (FIG. 2)), the impression monitor system 102 is provided with a cookie generator 1504.

In the illustrated example, to generate login timestamps (e.g., the login timestamp 220 of FIG. 2), the impression monitor system 102 is provided with a timestamp generator 1506. For example, the timestamp generator 1506 may be implemented using a real-time clock (RTC) or any other timing or clock device or interface to track time and generate timestamps. In the illustrated example, to generate messages (e.g., the response 216 of FIG. 2), the impression monitor system 102 is provided with a message generator 1508. In the illustrated example, to log impressions, the impression monitor system 102 is provided with an impression logger 1510. For example, the impression logger 1510 may log impressions in the AME impression store 114 as shown in FIG. 6.

In the illustrated example, to receive messages and/or information from client devices 108 and send messages and/or information to client devices 108 and/or to partner database proprietors 104a and 104b, the impression monitor system 102 is provided with a communication interface 1512. For example, the communication interface 1512 may receive messages such as the tag requests 112 (FIG. 1) and the request 206 (FIG. 2) from client devices 108. Additionally, the communication interface 1512 may send messages such as the response 216 (FIG. 2) to the client devices 108 and send logged impressions (e.g., impressions logged in the AME impression store 114) to partner database proprietors 104a and 104b.

Figure 16:
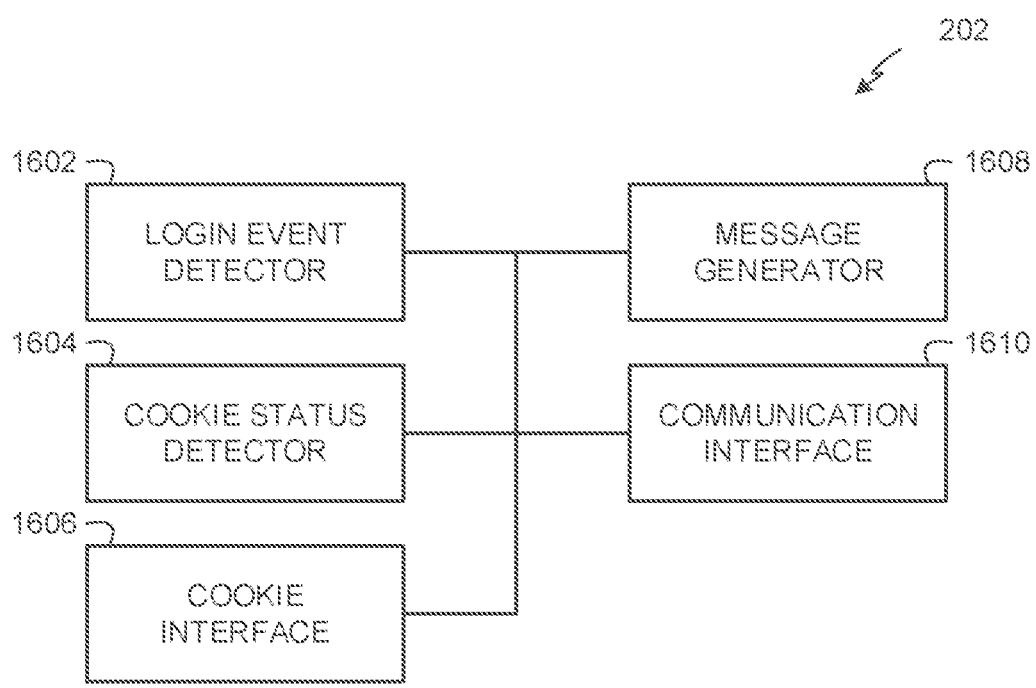
FIG. 16 is an example apparatus that may be used to implement a cookie reporter of FIG. 2.

FIG. 16 is an example apparatus that may be used to implement a cookie reporter 202 of FIG. 2. In the illustrated example, to detect log events, the cookie reporter 202 is provided with a login event detector 1602. For example, the login detector 1602 may be configured to monitor login events generated by web browsers (e.g., the web browser 302 of FIG. 3) of client devices (e.g., the client devices 108 of FIGS. 1-3). In the illustrated example, when a user logs in to the login webpage 204 of FIG. 2, the login detector 1602 detects a login event.

In the illustrated example, to detect whether AME cookies (e.g., the AME cookie 208 of FIG. 2) or partner cookies (e.g., the partner cookie 228 of FIG. 2) have been set (e.g., are stored) in client devices (e.g., the client devices 108 of FIGS. 1-3), the cookie reporter 202 is provided with a cookie status detector 1604. For example, the cookie status detector 1602 may inspect or analyze cookie files or cookie entries in client devices to determine whether AME cookies (e.g., the AME cookie 208 of FIG. 2) or partner cookies (e.g., the partner cookie 228 of FIG. 2) have been previously set. In the illustrated example, the cookie status detector 1604 may also determine whether cookies have expired. In the illustrated example, when a cookie expires, it is treated as invalid or as if it no longer exists in a client device and must be set again by a corresponding server domain.

In the illustrated example, to retrieve cookies from storage locations in client devices (e.g., the client devices 108 of FIGS. 1-3), the cookie reporter 202 is provided with a cookie interface 1606. For example, the cookie interface 1606 may retrieve AME cookies (e.g., the AME cookie 208 of FIG. 2) or partner cookies (e.g., the partner cookie 228 of FIG. 2) from their respective storage locations in client devices. In addition, the cookie interface 1606 may also store cookies set by and received from the impression monitor system 102 and/or any partner database proprietor in the client devices.

In the illustrated example, to generate messages (e.g., the tag requests 112 of FIGS. 1 and 3, the log reporting messages 118 of FIGS. 1 and 2, and the request 206 of FIG. 2), the cookie reporter 202 is provided with a message generator 1608. In the illustrated example, to send messages and/or information to the impression monitor system 102 and/or to partner database proprietors (e.g., the partner database proprietors 104a and 104b of FIGS. 1 and 2) and/or to receive messages and/or information from the impression monitor system 102, the cookie reporter 202 is provided with a communication interface 1610. For example, the communication interface 1610 may send the tag requests 112 (FIGS. 1 and 3) and the request 206 of FIG. 2 to the impression monitor system 102, receive the response 216 (FIG. 2) from the impression monitor system 102, and send the login reporting messages 118 (FIGS. 1 and 2) to the partner database proprietors 104a and 104b.

While example manners of implementing the apparatus 102 and 202 have been illustrated in FIGS. 15 and 16, one or more of the elements, processes and/or devices illustrated in FIGS. 15 and 16 may be combined, divided, re-arranged, omitted, eliminated and/or implemented in any other way. Further, the cookie status detector 1502, the cookie generator 1504, the timestamp generator 1506, the message generator 1508, the impression logger 1510, the communication interface 1512 and/or, more generally, the example apparatus 102 of FIG. 15 may be implemented by hardware, software, firmware and/or any combination of hardware, software and/or firmware. In addition, the login event detector 1602, the cookie status detector 1604, the cookie interface 1606, the message generator 1608, the communication interface 1610 and/or, more generally, the example apparatus 202 of FIG. 16 may be implemented by hardware, software, firmware and/or any combination of hardware, software and/or firmware. Thus, for example, any of the cookie status detector 1502, the cookie generator 1504, the timestamp generator 1506, the message generator 1508, the impression logger 1510, the communication interface 1512 and/or, more generally, the example apparatus 102 and/or any of the login event detector 1602, the cookie status detector 1604, the cookie interface 1606, the message generator 1608, the communication interface 1610 and/or, more generally, the example apparatus 202 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the cookie status detector 1502, the cookie generator 1504, the timestamp generator 1506, the message generator 1508, the impression logger 1510, the communication interface 1512, the login event detector 1602, the cookie status detector 1604, the cookie interface 1606, the message generator 1608, and/or the communication interface 1610 are hereby expressly defined to include a tangible computer readable medium such as a memory, DVD, CD, BluRay disk, etc. storing the software and/or firmware. Further still, the example apparatus 102 and 202 may include one or more elements, processes and/or devices in addition to, or instead of, those illustrated in FIGS. 15 and 16, and/or may include more than one of any or all of the illustrated elements, processes and devices.

Turning to FIG. 8, an example impressions totalization data structure 800, which may be generated by the report generator 412 of FIG. 4, stores impression totalizations based on the impressions logged by the impression monitor system 102 (FIGS. 1-3). As shown in FIG. 8, the impressions totalization structure 800 shows quantities of impressions logged for the client devices 108 (FIGS. 1-3). In the illustrated example, the impressions totalization structure 800 is generated by the report generator 412 for an advertisement campaign (e.g., one or more of the advertisements 110 of FIG. 1) to determine frequencies of impressions per day for each monitored user.

To track frequencies of impressions per unique user per day, the impressions totalization structure 800 is provided with a frequency column 802. A frequency of 1 indicates one exposure per day of an ad campaign to a unique user, while a frequency of 4 indicates four exposures per day of the same ad campaign to a unique user. To track the quantity of unique users to which impressions are attributable, the impressions totalization structure 800 is provided with a UUIDs column 804. A value of 100,000 in the UUIDs column 804 is indicative of 100,000 unique users. Thus, the first entry of the impressions totalization structure 800 indicates that 100,000 unique users (i.e., UUIDs=100,000) were exposed once (i.e., frequency=1) in a single day to a particular ad campaign.

To track impressions based on exposure frequency and UUIDs, the impressions totalization structure 800 is provided with an impressions column 806. Each impression count stored in the impressions column 806 is determined by multiplying a corresponding frequency value stored in the frequency column 802 with a corresponding UUID value stored in the UUID column 804. For example, in the second entry of the impressions totalization structure 800, the frequency value of two is multiplied by 200,000 unique users to determine that 400,000 impressions are attributable to a particular ad campaign.

Turning to FIG. 9, an ad campaign-level age/gender and impression composition data structure 900 is shown, which, in the illustrated example, may be generated by the report generator 412 of FIG. 4. The impression data in the ad campaign-level age/gender and impression composition structure 900 of FIG. 9 corresponds to impressions attributable to registered user of a particular partner database (DB) proprietor (e.g., the partner A database proprietor 104a of FIGS. 1 and 2 or the partner B database proprietor 104b of FIG. 1). Similar tables can be generated for content and/or other media. Additionally or alternatively, other media in addition to advertisements may be added to the data structure 900.

The ad campaign-level age/gender and impression composition structure 900 is provided with an age/gender column 902, an impressions column 904, a frequency column 906, and an impression composition column 908. The age/gender column 902 of the illustrated example indicates different age/gender demographic groups. The impressions column 904 of the illustrated example stores values indicative of the total impressions for a particular ad campaign for corresponding age/gender demographic groups. The frequency column 906 of the illustrated example stores values indicative of the frequency of exposure per user for the ad campaign that contributed to the impressions in the impressions column 904. The impressions composition column 908 of the illustrated example stores the percentage of impressions for each of the age/gender demographic groups.

In some examples, the demographics analyzer 406 and the demographics modifier 408 of FIG. 4 perform demographic accuracy analyses and adjustment processes on demographic information before tabulating final results of impression-based demographic information in the campaign-level age/gender and impression composition table 900. This can be done to address a problem facing online audience measurement processes in that the manner in which registered users represent themselves to online database proprietors (e.g., the partners 104a and 104b) is not necessarily veridical (e.g., truthful and/or accurate). In some instances, example approaches to online measurements that leverage account registrations at such online database proprietors to determine demographic attributes of an audience may lead to inaccurate demographic-exposure results if they rely on self-reporting of personal/demographic information by the registered users during account registration at the database proprietor site. There may be numerous reasons for why users report erroneous or inaccurate demographic information when registering for database proprietor services. The self-reporting registration processes used to collect the demographic information at the database proprietor sites (e.g., social media sites) does not facilitate determining the veracity of the self-reported demographic information. In some examples, to analyze and/or adjust inaccurate demographic information, the demographics analyzer 406 and/or the demographics modifier 408 may use example methods, systems, apparatus, and/or articles of manufacture disclosed in U.S. patent application Ser. No. 13/209,292, filed on Aug. 12, 2011, and titled "Methods and Apparatus to Analyze and Adjust Demographic Information," which is hereby incorporated herein by reference in its entirety.

Although the example ad campaign-level age/gender and impression composition structure 900 shows impression statistics in connection with only age/gender demographic information, the report generator 412 of FIG. 4 may generate the same or other data structures to additionally or alternatively include other types of demographic information. In this manner, the report generator 412 can generate the impression reports 106a (FIGS. 1 and 4) to reflect impressions based on different types of demographics and/or different types of media.

FIGS. 10-13 are flow diagrams representative of machine readable instructions that can be executed to implement the apparatus and systems of FIGS. 1, 2, 3, and/or 4. The example processes of FIGS. 10-13 may be implemented using machine readable instructions that, when executed, cause a device (e.g., a programmable controller or other programmable machine or integrated circuit) to perform the operations shown in FIGS. 10-13. In this example, the machine readable instructions comprise a program for execution by a processor such as the processor 1412 shown in the example computer 1410 discussed below in connection with FIG. 14. The program may be embodied in software stored on a tangible computer readable medium such as a CD-ROM, a floppy disk, a hard drive, a digital versatile disk (DVD), a BluRay disk, a flash memory, a read-only memory (ROM), a random-access memory (RAM), or a memory associated with the processor 1412, but the entire program and/or parts thereof could alternatively be executed by a device other than the processor 1412 and/or embodied in firmware or dedicated hardware.

As used herein, the term tangible computer readable medium is expressly defined to include any type of computer readable storage and to exclude propagating signals. Additionally or alternatively, the example processes of FIGS. 10-13 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Alternatively, the example processes of FIGS. 10-13 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 10-13 may be implemented as any combination(s) of any of the foregoing techniques, for example, any combination of firmware, software, discrete logic and/or hardware.

Although the example processes of FIGS. 10-13 are described with reference to the flow diagrams of FIGS. 10-13, other methods of implementing the apparatus and systems of FIGS. 1, 2, 3, and/or 4 may be employed. For example, the order of execution of the blocks may be changed, and/or some of the blocks described may be changed, eliminated, sub-divided, or combined. Additionally, one or both of the example processes of FIGS. 10-13 may be performed sequentially and/or in parallel by, for example, separate processing threads, processors, devices, discrete logic, circuits, etc.

Figure 10:
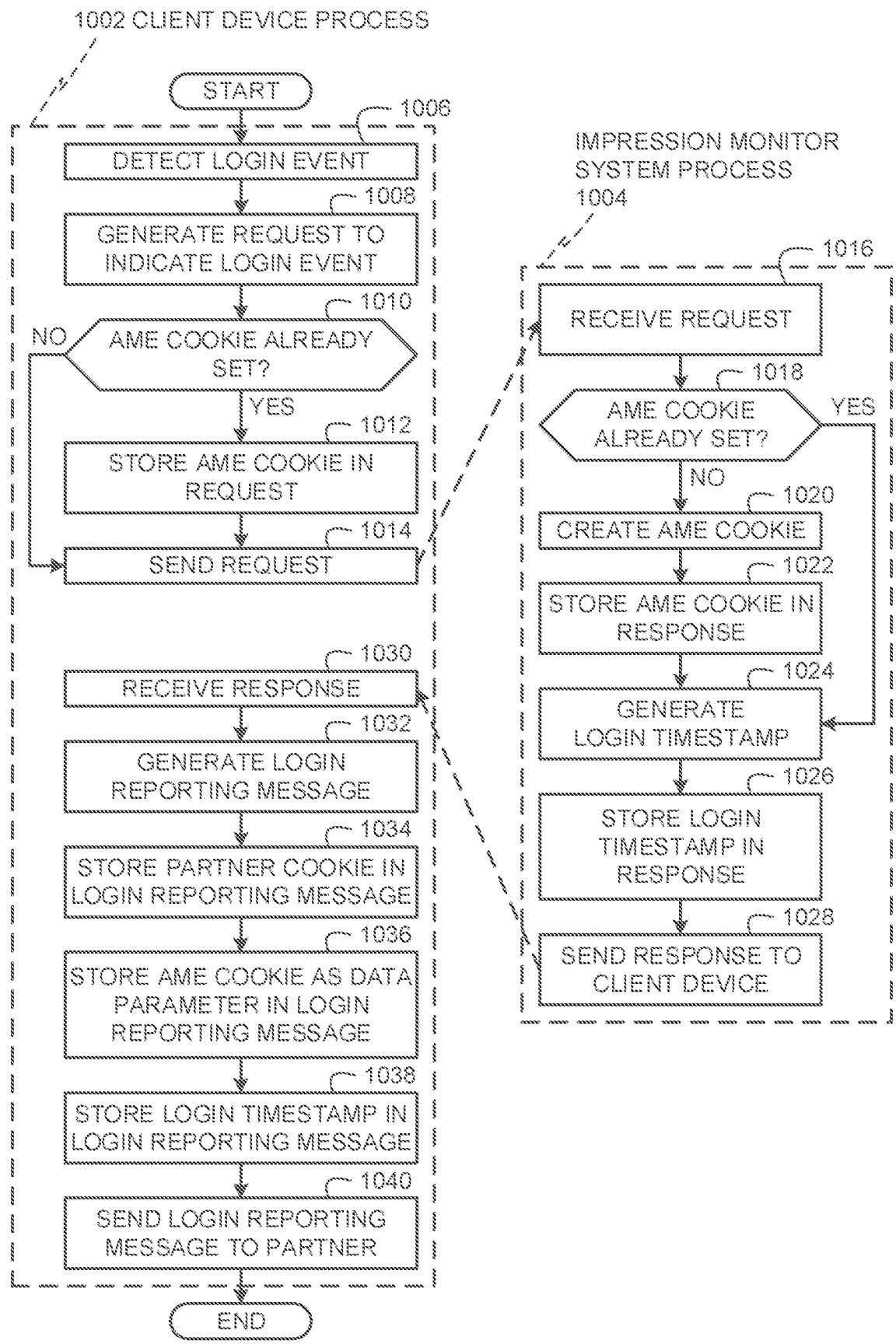
FIG. 10 is a flow diagram representative of example machine readable instructions that may be executed to report login events and user cookies to database proprietors.

Turning in detail to FIG. 10, the depicted example processes may be used to report login events and user cookies (e.g., the AME cookie 208 and the partner A cookie 228 of FIGS. 2 and 3) to database proprietors (e.g., the partner A database proprietor 104a of FIGS. 1 and 2). In the illustrated example, the flow diagram shows a client device process 1002 and an impression monitor system process 1004. In the illustrated example, the client device process 1002 may be performed by the cookie reporter 202 of FIGS. 2 and 16, and the impression monitor system process 1004 may be implemented by the impression monitor system 102 of FIGS. 1-3 and 15. The example processes of FIG. 10 are described in connection with FIG. 2 as interactions between the client device 108, the impression monitor system 102, and the partner A database proprietor 104a. However, processes similar or identical to the example processes of FIG. 10 may be performed at any time or at the same time between other client devices, the impression monitor system 102 and/or other database proprietors to accomplish the same type of user login reporting events when users login to login pages (e.g., the login page 204 of FIG. 2) of respective database proprietors (e.g., the database proprietors 104a and 104b of FIGS. 1 and 2).

Initially, as part of the client device process 1002, the login event detector 1602 (FIG. 16) detects a login event (block 1006). The login event may be, for example, a user of the client device 108 logging into the login page 204 of FIG. 2. The message generator 1608 (FIG. 16) generates the request 206 (FIG. 2) to indicate the login event (block 1008). The cookie status detector 1604 (FIG. 16) determines whether an AME cookie (e.g. the AME cookie 208 of FIG. 2) is already set in the client device 108 (block 1010). If the AME cookie 208 is already set, the cookie interface 1606 (FIG. 16) and/or the message generator 1608 store(s) the AME cookie 208 (e.g., a name-value pair identifying a user) in the request 206 (block 1012). After storing the AME cookie 208 in the request 206 (block 1012) or if the AME cookie 208 is not already set in the client device (block 1010), the communication interface 1610 (FIG. 16) sends the request 206 to the impression monitor system 102 (block 1014).

As shown in the example impression monitor system process 1004, the communication interface 1512 (FIG. 15) receives the request 206 (block 1016), and the cookie status detector 1502 (FIG. 15) determines whether the AME cookie 208 is already set in the client device 108 (block 1018). For example, the cookie status detector 1502 can determine whether the AME cookie 208 is already set based on whether the request 206 contains the AME cookie 208. If the cookie status detector 1502 determines that the AME cookie 208 is not already set (block 1018), the cookie generator 1504 (FIG. creates the AME cookie 208 (block 1020). For example, the cookie generator 1504 can generate the AME cookie 208 by generating a UUID for the client device 108. The message generator 1508 (FIG. 15) stores the AME cookie 208 in the response 216 (FIG. 2) (block 1022).

After storing the AME cookie 208 in the response 216 (block 1022) or if the cookie status detector 1502 determines at block 1018 that the AME cookie 208 is already set in the client device 108, the timestamp generator 1506 generates a login timestamp (e.g., the login timestamp 220 of FIG. 2) (block 1024) to indicate a login time for the detected login event. The message generator 1508 stores the login timestamp 220 in the response 216 (block 1026), and the communication interface 1512 sends the response 216 to the client device 108 (block 1028).

Returning to the client device process 1002, the communication interface 1610 (FIG. 16) receives the response 216 (block 1030), and the message generator 1608 (FIG. 16) generates the login reporting message 118 (FIGS. 1 and 2) (block 1032). If present, the cookie interface 1606 (FIG. 16) and/or the message generator 1608 store(s) a partner cookie corresponding to the login event detected at block 1006 (e.g., the partner A cookie 228) in the login reporting message 118 (block 1034). If a corresponding partner cookie is not present in the client device 108, a partner cookie is not stored in the login reporting message 118 to indicate to the corresponding partner that it should create a partner cookie for the client device 108. In addition, the cookie interface 1606 and/or the message generator 1608 store(s) the AME cookie 208 as a data parameter (e.g., in the payload 232) in the login reporting message 118 (block 1036). The message generator 1608 also stores the login timestamp 220 in the login reporting message 118 (e.g., in the payload 232) (block 1038). The communication interface 1610 sends the login reporting message 118 to a corresponding partner database proprietor (e.g., the partner A database proprietor 104a) (block 1040). In this manner, the cookie reporter 202 enables the partner A database proprietor 104a to map the partner A cookie 228 to the AME cookie 208 and the login timestamp 220 in the partner cookie map 236 of FIGS. 2 and 5. The example process of FIG. 10 then ends.

Figure 11:
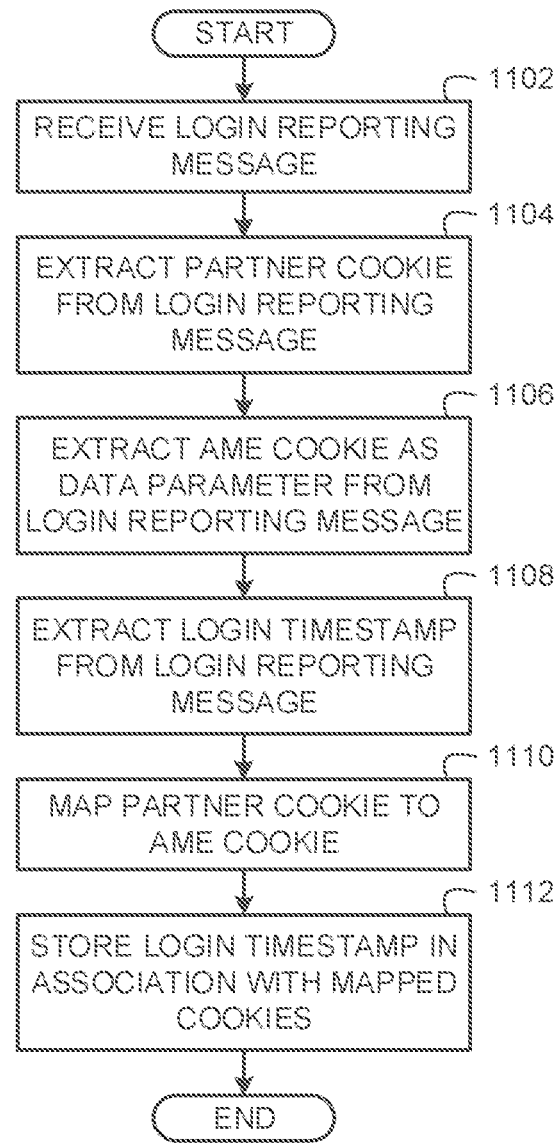
FIG. 11 is a flow diagram representative of example machine readable instructions that may be executed to map audience measurement entity (AME) cookie identifiers to user identifiers of users registered with a database proprietor.

Turning now to FIG. 11, the depicted flow diagram is representative of an example process that may be performed by a partner database proprietor (e.g., the partner database proprietors 104a and/or 104b of FIGS. 1 and 2) to map AME cookie identifiers (e.g., a UUID of the AME cookie 208 of FIG. 2) with user identifiers (e.g., a UUID of the partner A cookie 228 of FIG. 2) of users registered with the partner database proprietor. While for simplicity, FIG. 11 refers to a process receiving a single login message, many such processes may exist and execute in parallel (e.g., parallel threads). The example process of FIG. 11 is described in connection with the illustrated example of FIG. 2, the apparatus 400 of FIG. 4, and the partner A database proprietor 104a. However, processes similar or identical to the example processes of FIG. 11 may be performed at any time or at the same time by other partner database proprietors and/or other apparatus to accomplish the same type of cookie mapping process.

Initially, the partner A database proprietor 104a receives the login reporting message 118 (FIGS. 1 and 2) (block 1102). The data parser 414 (FIG. 4) extracts the partner A cookie 228 (block 1104) from the login reporting message 118. In the illustrated example, the data parser 414 extracts the partner A cookie 228 from the cookie field 230 of the login reporting message 118. The data parser 414 extracts the AME cookie 208 (block 1106) from the login reporting message 118. In the illustrated example, the data parser 414 extracts the AME cookie 208 as a data parameter from the payload 232 of the login reporting message 118. In addition, the data parser 414 extracts the login timestamp 220 from the login reporting message 118 (block 1108). The mapper 416 (FIG. 4) maps the partner A cookie 228 to the AME cookie 208 (e.g., maps the UUIDs of each cookie to one another) (block 1110) in, for example, the partner cookie map 236 of FIGS. 2 and 5. In addition, the mapper 416 stores the login timestamp 220 in association with the mapped cookies (block 1112) in the partner cookie map 236. The example process of FIG. 11 then ends.

Figure 12:
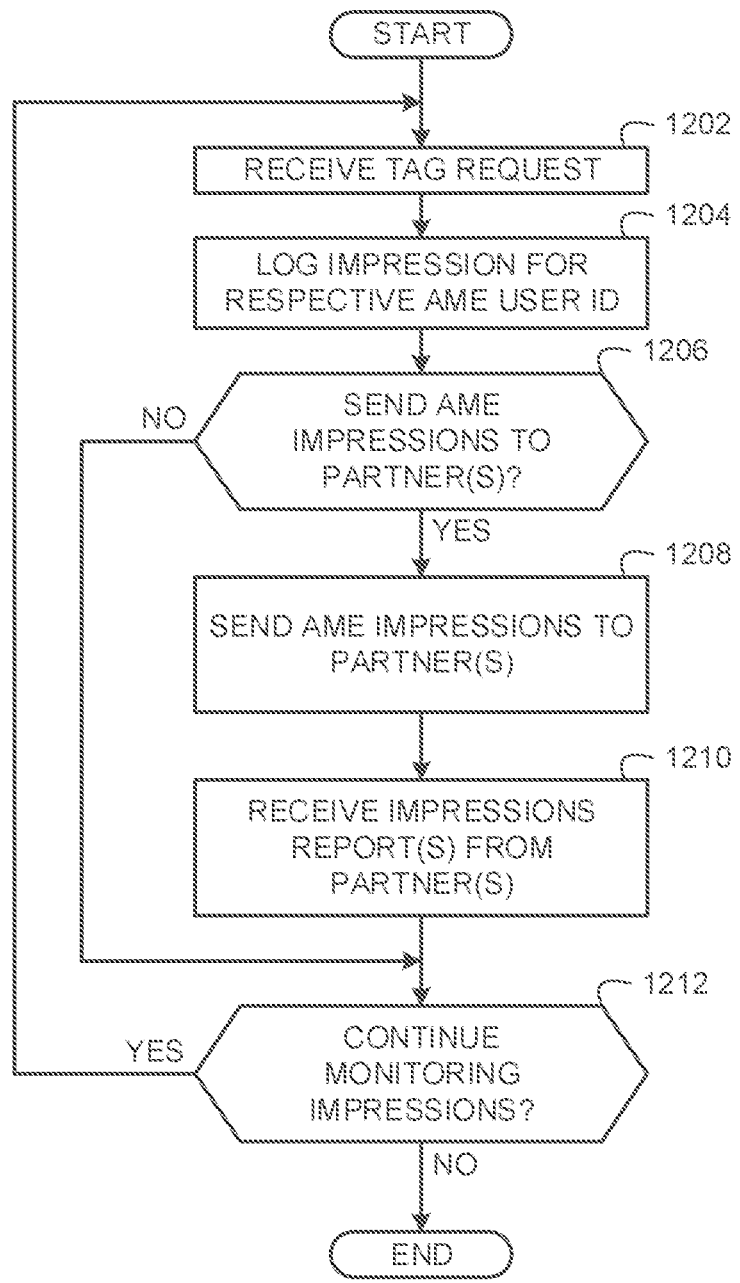
FIG. 12 is a flow diagram representative of example machine readable instructions that may be executed to log impressions.

Now turning to FIG. 12, the depicted example process may be performed to log impressions. In the illustrated example, the example process of FIG. 12 is described in connection with FIGS. 3 and 15 as being performed by the impression monitor system 102 based on tag requests received from the client device 108. However, processes similar or identical to the example process of FIG. 12 may be performed at any time or at the same time (e.g., multiple threads may be spawned and execute in parallel) by the impression monitor system 102 in connection with other client devices (e.g., any of the client devices 108 of FIG. 1 or any other client devices) to log impressions attributable to those client devices.

Initially, the communication interface 1512 (FIG. 15) receives a tag request (e.g., the tag request 112 of FIGS. 1 and 3) (block 1202). The impression logger 1510 (FIG. 15) logs an impression for an AME UUID indicated by the AME cookie 208 (block 1204). In the illustrated example, the impression logger 1510 logs the impression in the AME impression store 114 of FIGS. 1, 3, and 6. The impression logger 1510 determines whether it should send the AME impression logs 122 (FIGS. 1 and 4) to one or more partner database proprietors (block 1206). For example, the impression logger 1510 may be configured to periodically or aperiodically send the AME impression logs 122 to one or more partner database proprietors (e.g., the partner database proprietors 104a and 104b of FIGS. 1 and 2) based on one or more of a schedule and/or a threshold of logged impressions.

If the impression logger 1510 determines that it should send the AME impression logs 122 to one or more partner database proprietors (block 1206), the communication interface 1512 sends the AME impression logs 122 to the one or more partner database proprietors (block 1208). In response, the communication interface 1512 receives one or more impression reports (e.g., the impression reports 106a and 106b of FIGS. 1 and 4) from the one or more partner database proprietors (block 1210). In some examples, the impression monitor system 102 applies weighting factors to impression audience data in impression reports from different database proprietors (e.g., the partner database proprietors 104a and 104b). In some examples, the weighting factors are determined for each database proprietor based on, for example, demographic distributions and/or impression distributions in the impression data and/or sample sizes (e.g., the quantity of registered users of a particular database proprietor, the quantity of registered users monitored for the particular database proprietor, and/or the quantity of impressions logged by the AME 103 for registered users of the particular database proprietor).

After receiving the one or more impression reports (block 1210) or if at block 1206 the impression logger 1510 determines that it should not send the AME impression logs 122 to one or more partner database proprietors, the impression monitor system 102 determines whether it should continue to monitor impressions (block 1212). For example, the impression monitor system 102 may be configured to monitor impressions until it is turned off or disabled. If the impression monitor system 102 determines that it should continue to monitor impressions (block 1212), control returns to block 1202. Otherwise, the example process of FIG. 12 ends.

Figure 13:
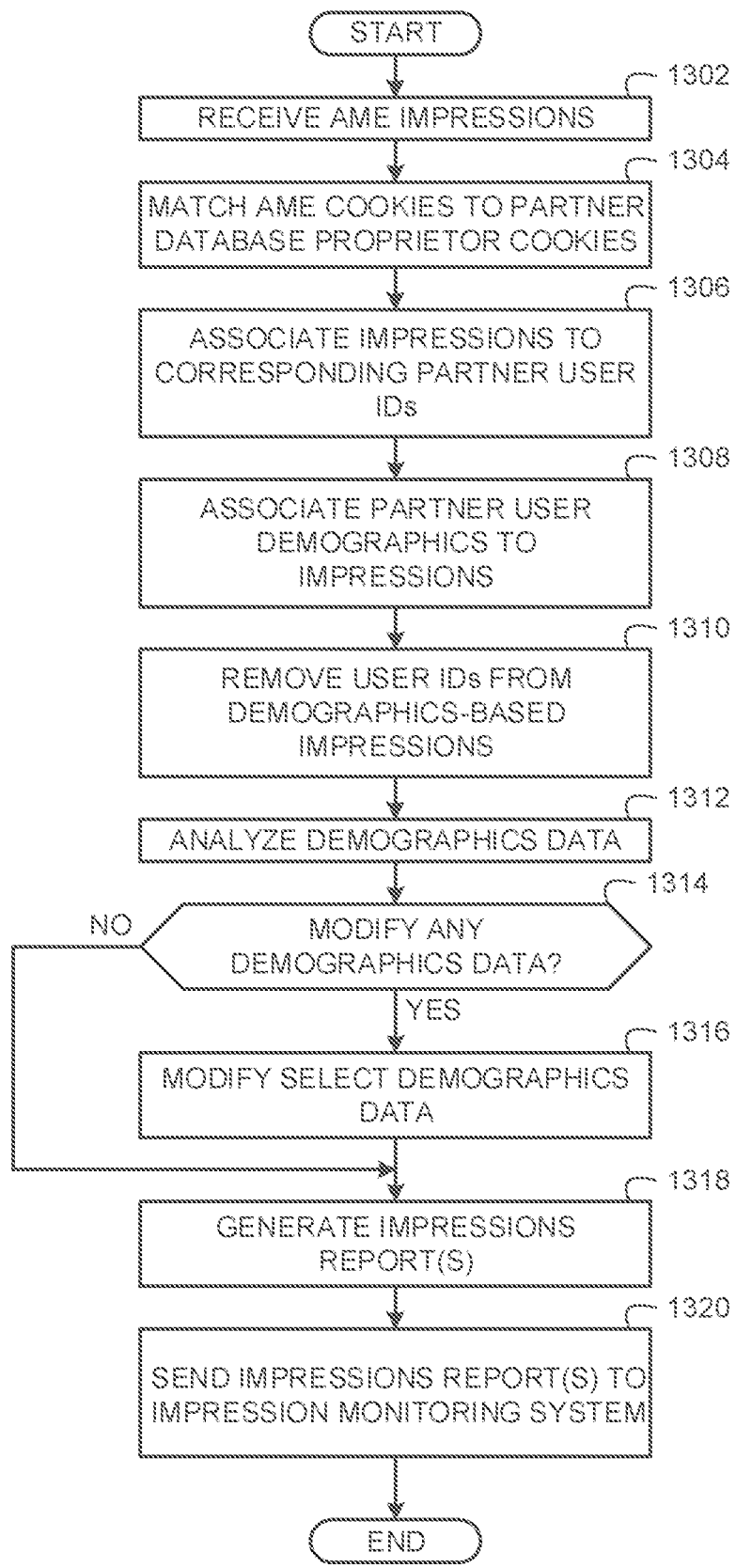
FIG. 13 is a flow diagram representative of example machine readable instructions that may be executed to generate demographics-based impressions reports.

Turning now to FIG. 13, the depicted example process may be used to generate demographics-based impressions reports (e.g., the impression reports 106a and 106b of FIGS. 1 and 4). The example process of FIG. 13 is described in connection with FIG. 4 as being implemented by the example apparatus 400 via the partner A database proprietor 104a. However, processes similar or identical to the example process of FIG. 13 may be performed at any time or at the same time by any other partner database proprietor(s) to generate impression reports based on registered users of those partner database proprietor(s).

Initially, the apparatus 400 receives the AME impression logs 122 (FIG. 4) (block 1302). The cookie matcher 402 (FIG. 4) matches AME cookies to partner database proprietor cookies (block 1304). For example, the cookie matcher 402 can use a cookie map of the corresponding database proprietor (e.g., the partner A cookie map 236 (FIG. 4)) to match UUIDs from AME cookies (e.g., the AME cookie 208 of FIGS. 2 and 3) indicated in the AME impression logs 122 to UUIDs from partner database proprietor cookies (e.g., the partner A database proprietor cookie 228 of FIGS. 2 and 3). The cookie matcher 402 then associates impressions (e.g., impressions noted in the AME impression logs 122) to corresponding partner database proprietor UUIDs (block 1306) based on matches found at block 1304. For example, the cookie matcher 402 may generate the partner-based impressions data structure 700 described above in connection with FIG. 7.

The demographics associator 404 (FIG. 4) associates demographics of registered users of the corresponding database proprietor (e.g., the partner A database proprietor 104a) to the impressions (block 1308). For example, the demographics associator 404 may retrieve demographics information from the user accounts database 238 (FIGS. 2 and 4) for partner user IDs noted in the partner user ID column 712 of the partner-based impressions data structure 700.

The user ID modifier 410 removes user IDs from the demographics-based impressions data structure 700 (block 1310). For example, the user ID modifier 410 can remove UUIDs from the AME user ID column 702 corresponding to AME cookies (e.g., the AME cookie 208 of FIGS. 2 and 3) and the partner user ID column 712 corresponding to partner cookies (e.g., the partner A cookie 228 of FIGS. 2 and 3). In other examples, the report generator 412 can copy selected portions from the demographics-based impressions data structure 700 and store the selected portions in a report without copying over the user IDs. In this manner, the apparatus 400 can obfuscate identities of registered users to protect their privacy when the demographics-based impressions are shared with others (e.g., an audience measurement entity).

The demographics analyzer 406 (FIG. 4) analyzes the demographics information (block 1312) that was associated with the impressions at block 1308. The demographics analyzer 406 determines whether any demographics information needs to be modified (block 1314). If any of the demographics information needs to be modified (e.g., demographics information needs to be changed or added due to being incomplete and/or inaccurate), the demographics modifier 408 (FIG. 4) modifies select demographics data needing modification (block 1316). In the illustrated example, the demographics analyzer 406 and/or the demographics modifier 408 may perform the operations of blocks 1312, 1314, and 1316 to analyze and/or modify demographics information using, for example, one or more example techniques disclosed in U.S. patent application Ser. No. 13/209,292, filed on Aug. 12, 2011, and titled "Methods and Apparatus to Analyze and Adjust Demographic Information," which is hereby incorporated herein by reference in its entirety.

After modifying demographics information at block 1316 or if at block 1314 the demographics analyzer 406 determines that none of the demographics information requires modification, the report generator 412 generates one or more impression reports (e.g., the impression reports 106a of FIGS. 1 and 4) (block 1318). For example, the report generator 412 may generate one or more of the impression reports 106a using one or more example techniques described above in connection with FIGS. 8 and 9 and/or using any other suitable technique(s). The apparatus 400 then sends the one or more impression reports 106a to the impression monitor system 102 (block 1320). In the illustrated example, the impression reports 106a are indicative of demographic segments, populations, or groups associated with different AME cookies 208 (and corresponding partner A cookies 228) and that were exposed to content (e.g., advertisements and/or other media) identified by campaign IDs and/or other the media content IDs. The example process of FIG. 13 then ends.

Figure 14:
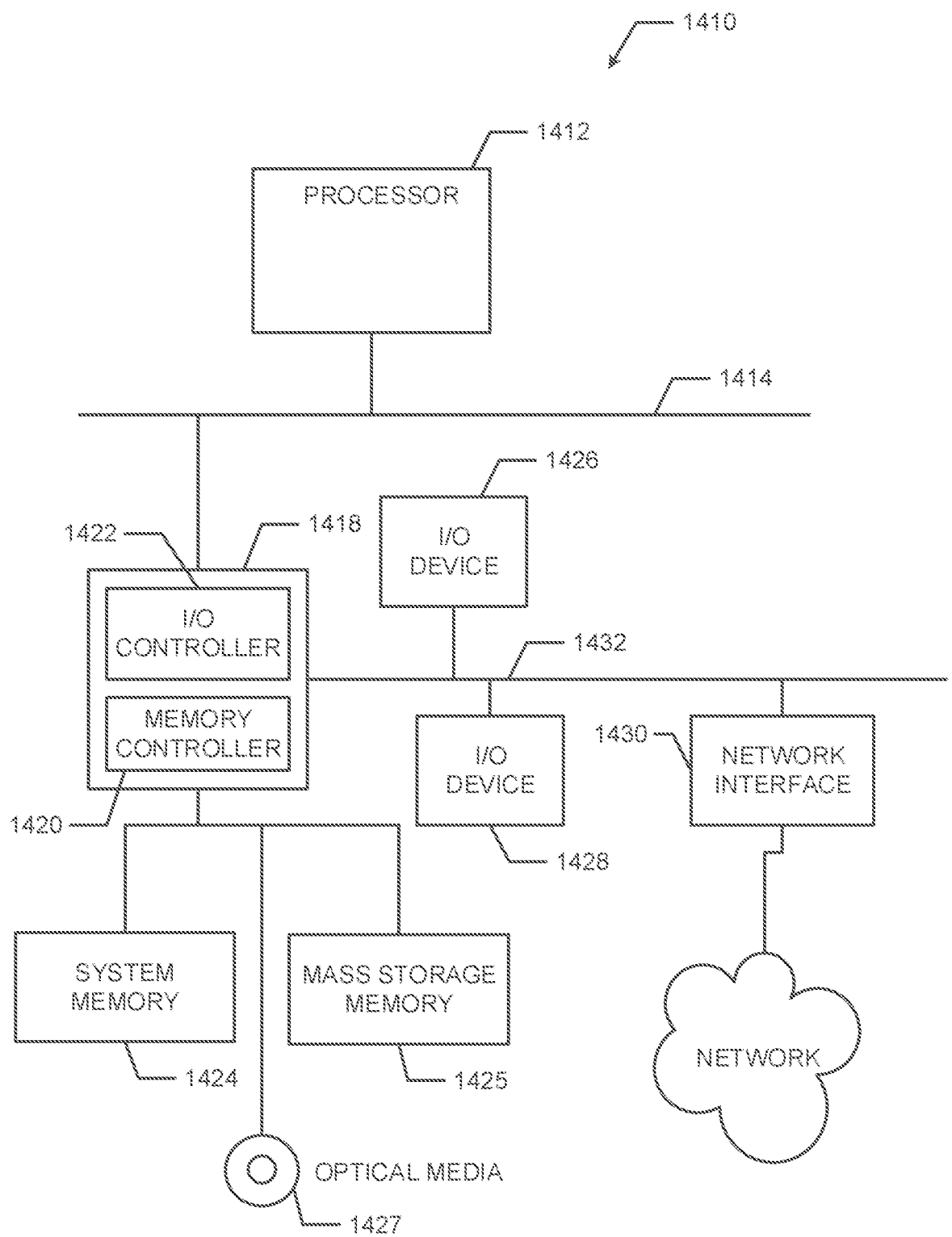
FIG. 14 is an example processor system that can be used to execute the example instructions of FIGS. 10-13 to implement the example apparatus and systems of FIGS. 1, 2, 3, and/or 4.

FIG. 14 is a block diagram of an example processor system 1410 that may be used to implement the example apparatus, methods, and systems disclosed herein. As shown in FIG. 14, the processor system 1410 includes a processor 1412 that is coupled to an interconnection bus 1414. The processor 1412 may be any suitable processor, processing unit, or microprocessor. Although not shown in FIG. 14, the system 1410 may be a multi-processor system and, thus, may include one or more additional processors that are identical or similar to the processor 1412 and that are communicatively coupled to the interconnection bus 1414.

The processor 1412 of FIG. 14 is coupled to a chipset 1418, which includes a memory controller 1420 and an input/output (I/O) controller 1422. A chipset provides I/O and memory management functions as well as a plurality of general purpose and/or special purpose registers, timers, etc. that are accessible or used by one or more processors coupled to the chipset 1418. The memory controller 1420 performs functions that enable the processor 1412 (or processors if there are multiple processors) to access a system memory 1424, a mass storage memory 1425, and/or an optical media 1427.

In general, the system memory 1424 may include any desired type of volatile and/or non-volatile memory such as, for example, static random access memory (SRAM), dynamic random access memory (DRAM), flash memory, read-only memory (ROM), etc. The mass storage memory 1425 may include any desired type of mass storage device including hard disk drives, optical drives, tape storage devices, etc. The optical media 1427 may include any desired type of optical media such as a digital versatile disc (DVD), a compact disc (CD), or a blu-ray optical disc. The instructions of any of FIGS. 10-13 may be stored on any of the tangible media represented by the system memory 1424, the mass storage device 1425, the optical media 1427, and/or any other media.

The I/O controller 1422 performs functions that enable the processor 1412 to communicate with peripheral input/output (I/O) devices 1426 and 1428 and a network interface 1430 via an I/O bus 1432. The I/O devices 1426 and 1428 may be any desired type of I/O device such as, for example, a keyboard, a video display or monitor, a mouse, etc. The network interface 1430 may be, for example, an Ethernet device, an asynchronous transfer mode (ATM) device, an 802.11 device, a digital subscriber line (DSL) modem, a cable modem, a cellular modem, etc. that enables the processor system 1410 to communicate with another processor system.

While the memory controller 1420 and the I/O controller 1422 are depicted in FIG. 14 as separate functional blocks within the chipset 1418, the functions performed by these blocks may be integrated within a single semiconductor circuit or may be implemented using two or more separate integrated circuits.

Although the above discloses example methods, apparatus, systems, and articles of manufacture including, among other components, firmware and/or software executed on hardware, it should be noted that such methods, apparatus, systems, and articles of manufacture are merely illustrative and should not be considered as limiting. Accordingly, while the above describes example methods, apparatus, systems, and articles of manufacture, the examples provided are not the only ways to implement such methods, apparatus, systems, and articles of manufacture.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
   obtaining, at a server, a response to a hypertext transfer protocol (HTTP) request as a network communication from a client device via a network;
   logging, at the server, a website impression of a website by the client device based on the response to the HTTP request obtained via the website, the website impression including a site identifier corresponding to the website and a timestamp;
   determining a demographic weighting factor for impressions of the website based on demographic distributions of registered users of a database proprietor, the impressions of the website including the website impression;
   weighting the impressions of the website based on the demographic weighting factor for the impressions of the website to obtain weighted impression data; and generating a report including the weighted impression data.

2. The method of claim 1, wherein the website impression of the website by the client device is representative of a website visit to the website, the website visit associated with the HTTP request.

3. The method of claim 1, where the website impression further includes a user identifier different from a type of identifier used to identify the registered users of the database proprietor.

4. The method of claim 3, wherein the user identifier is a cookie identifier associated with the server.

5. The method of claim 1, wherein determining the demographic weighting factor for the impressions of the website comprises associating the demographic distributions of the registered users of the database proprietor with a number of website visits to the website by the registered users of the database proprietor.

6. The method of claim 1, wherein determining the demographic weighting factor for the impressions of the website comprises retrieving demographic information for each user account of the registered users of the database proprietor as the demographic distributions of the registered users of the database proprietor.

7. The method of claim 1, wherein determining the demographic weighting factor for the impressions of the website comprises identifying a quantity of the registered users of the database proprietor.

8. The method of claim 1, wherein the client device is at least one of a computer or a phone.

9. The method of claim 1, where the database proprietor is at least one of a social network proprietor, a search engine proprietor, an online retail proprietor, or any proprietor having a database and connected to the server.

10. A non-transitory computer-readable storage medium, having stored thereon instructions that, upon execution by a processor, cause performance of a set of operations comprising:
    obtaining, at a server, a hypertext transfer protocol (HTTP) response to a HTTP request from a website based on a website visit by a client device;
    logging, at the server, a website impression of the website by the client device based on an HTTP communication, the website impression including a site identifier corresponding to the website;
    determining a demographic weighting factor based on demographic distributions of registered users of a database proprietor;
    weighting impressions of the website including the website impression based on the demographic weighting factor; and
    generating a report including the weighted impressions of the website.

11. The non-transitory computer-readable storage medium of claim 10, wherein the website impression of the website by the client device is representative of the website visit to the website, the website visit associated with the HTTP communication.

12. The non-transitory computer-readable storage medium of claim 10, the set of operations further comprising:
    associating the demographic distributions of the registered users of the database proprietor with a number of website visits to the website.

13. The non-transitory computer-readable storage medium of claim 10, the set of operations further comprising:
    retrieving demographic information regarding the registered users of the database provider as the demographic distributions of the registered users of the database provider.

14. The non-transitory computer-readable storage medium of claim 10, the set of operations further comprising:
    obtaining, via the Internet, the demographic distributions of the registered users associated with the database proprietor.

15. The non-transitory computer-readable storage medium of claim 10, wherein the client device is at least one of a computer or phone.

16. A computing system comprising:
    at least one processor;
    and at least one memory, the computing system configured to perform a set of acts, the acts being performed by the at least one processor executing instructions stored on the at least one memory, comprising:
    obtaining, at a server, a hypertext transfer protocol (HTTP) response to a HTTP request from a website based on a website visit by a client device;
    logging, at the server, a website impression of the website by the client device based on an HTTP communication, the website impression including a site identifier corresponding to the website;
    determining a demographic weighting factor based on demographic distributions of registered users associated with a database proprietor;
    weighting impressions of the website including the website impression based on the demographic weighting factor; and
    generating a report including the weighted impressions of the website.

17. The computing system of claim 16, the set of acts further comprising:
    obtaining, via the Internet, the demographic distributions of the registered users associated with the database proprietor.

18. The computing system of claim 16, wherein the client device is at least one of a computer or phone.

19. The computing system of claim 16, the set of acts further comprising:
    associating the demographic distributions of the registered users of the database proprietor with a number of website visits to the website.

20. The computing system of claim 16, the set of acts further comprising:
    retrieving the demographic distributions of the registered users of the database provider.

* * * * *